United States Patent
Sridhara et al.

(10) Patent No.: US 9,686,023 B2
(45) Date of Patent: Jun. 20, 2017

(54) METHODS AND SYSTEMS OF DYNAMICALLY GENERATING AND USING DEVICE-SPECIFIC AND DEVICE-STATE-SPECIFIC CLASSIFIER MODELS FOR THE EFFICIENT CLASSIFICATION OF MOBILE DEVICE BEHAVIORS

(71) Applicant: QUALCOMM Incorporated, San Diego, CA (US)

(72) Inventors: Vinay Sridhara, Santa Clara, CA (US); Rajarshi Gupta, Sunnyvale, CA (US); Kassem Fawaz, Ann Arbor, MI (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 14/091,707

(22) Filed: Nov. 27, 2013

(65) Prior Publication Data

US 2014/0187177 A1    Jul. 3, 2014

Related U.S. Application Data

(60) Provisional application No. 61/874,109, filed on Sep. 5, 2013, provisional application No. 61/874,129, filed
(Continued)

(51) Int. Cl.
*H04B 17/00* (2015.01)
*G06N 5/04* (2006.01)
*H04B 17/391* (2015.01)

(52) U.S. Cl.
CPC .............. *H04B 17/00* (2013.01); *G06N 5/043* (2013.01); *H04B 17/391* (2015.01)

(58) Field of Classification Search
None
See application file for complete search history.

(56) References Cited

U.S. PATENT DOCUMENTS

| 5,870,735 A | 2/1999 | Agrawal et al. |
| 6,532,541 B1 | 3/2003 | Chang et al. |

(Continued)

FOREIGN PATENT DOCUMENTS

| CN | 1961525 A | 5/2007 |
| CN | 101770453 A | 7/2010 |

(Continued)

OTHER PUBLICATIONS

Kaspersky Endpoint Security 8 for Smartphone Program Version 8.0, Updated on Feb. 8, 2012.*

(Continued)

*Primary Examiner* — Ankur Jain
*Assistant Examiner* — Zhitong Chen
(74) *Attorney, Agent, or Firm* — The Marbury Law Group, PLLC

(57) ABSTRACT

The various aspects provide a mobile device and methods implemented on the mobile device for modifying behavior models to account for device-specific or device-state-specific features. In the various aspects, a behavior analyzer module may leverage a full feature set of behavior models (i.e. a large classifier model) received from a network server to create lean classifier models for use in monitoring for malicious behavior on the mobile device, and the behavior analyzer module may dynamically modify these lean classifier models to include features specific to the mobile device and/or the mobile device's current configuration. Thus, the various aspects may enhance overall security for a particular mobile device by taking the mobile device and its current configuration into account and may improve overall performance by monitoring only features that are relevant to the mobile device.

30 Claims, 11 Drawing Sheets

Related U.S. Application Data on Sep. 5, 2013, provisional application No. 61/748,217, filed on Jan. 2, 2013, provisional application No. 61/748,220, filed on Jan. 2, 2013.

(56) References Cited

U.S. PATENT DOCUMENTS

| | | | |
|---|---|---|---|
| 6,643,802 B1 | 11/2003 | Frost et al. |
| 6,647,260 B2 | 11/2003 | Dusse et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,852,938 B2 | 12/2010 | Shi et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | McCallam |
| 8,225,093 B2 | 7/2012 | Fok |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2* | 9/2013 | Mahaffey et al. | ............... 726/25 |
| 8,554,912 B1 | 10/2013 | Reeves et al. |
| 8,694,744 B1 | 4/2014 | Raj et al. |
| 8,701,192 B1 | 4/2014 | Glick et al. |
| 8,762,298 B1 | 6/2014 | Ranjan et al. |
| 8,763,127 B2 | 6/2014 | Yao et al. |
| 8,775,333 B1* | 7/2014 | Zahn | ................... G06F 21/552 |
| | | | 706/12 |
| 8,782,412 B2 | 7/2014 | Charles et al. |
| 8,943,204 B2 | 1/2015 | Caldeira et al. |
| 9,432,361 B2 | 8/2016 | Mahaffey et al. |
| 2002/0099756 A1 | 7/2002 | Catthoor et al. |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1 | 2/2006 | Atkin et al. |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0174490 A1 | 7/2007 | Choi et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1 | 6/2008 | Tada |
| 2008/0162686 A1 | 7/2008 | Kalaboukis et al. |
| 2008/0163382 A1 | 7/2008 | Blue et al. |
| 2008/0172746 A1 | 7/2008 | Lotter et al. |
| 2008/0228429 A1 | 9/2008 | Huang et al. |
| 2009/0019546 A1 | 1/2009 | Park et al. |
| 2009/0019551 A1 | 1/2009 | Haga et al. |
| 2009/0192955 A1 | 7/2009 | Tang et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0293121 A1 | 11/2009 | Bigus et al. |
| 2009/0300765 A1 | 12/2009 | Moskovitch et al. |
| 2009/0327168 A1 | 12/2009 | Weinberger et al. |
| 2010/0005045 A1 | 1/2010 | Hiraoka et al. |
| 2010/0010949 A1 | 1/2010 | Ito et al. |
| 2010/0011029 A1 | 1/2010 | Niemelae |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1 | 7/2010 | Kandek et al. |
| 2010/0192201 A1 | 7/2010 | Shimoni et al. |
| 2010/0192222 A1* | 7/2010 | Stokes | ................... G06F 21/563 |
| | | | 726/22 |
| 2010/0241974 A1 | 9/2010 | Rubin et al. |
| 2010/0251340 A1 | 9/2010 | Martin et al. |
| 2010/0262693 A1* | 10/2010 | Stokes | ................ H04L 63/1408 |
| | | | 709/225 |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1* | 6/2011 | Mahaffey | ............... G06F 21/564 |
| | | | 726/22 |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1 | 5/2012 | Wittenschlaeger |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | McReynolds |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0245481 A1 | 9/2012 | Blanco et al. |
| 2012/0254333 A1 | 10/2012 | Chandramouli et al. |
| 2012/0270611 A1 | 10/2012 | Choi et al. |
| 2012/0311366 A1 | 12/2012 | Alsina et al. |

(56) References Cited

U.S. PATENT DOCUMENTS

| | | |
|---|---|---|
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2012/0331137 A1 | 12/2012 | Olsen et al. |
| 2013/0014262 A1 | 1/2013 | Lee et al. |
| 2013/0031600 A1 | 1/2013 | Luna et al. |
| 2013/0066815 A1* | 3/2013 | Oka .................. H04M 1/72569 706/12 |
| 2013/0073983 A1 | 3/2013 | Rasmussen et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0032358 A1 | 1/2014 | Perkowitz et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0245306 A1 | 8/2014 | Gathala |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |
| 2015/0339675 A1 | 11/2015 | Tuchman et al. |
| 2015/0356462 A1 | 12/2015 | Fawaz et al. |
| 2016/0088009 A1 | 3/2016 | Gupta et al. |

FOREIGN PATENT DOCUMENTS

| | | |
|---|---|---|
| CN | 101882000 A | 11/2010 |
| CN | 102202102 A | 9/2011 |
| CN | 102591696 A | 7/2012 |
| EP | 1182552 A2 | 2/2002 |
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| JP | 2010113488 A | 5/2010 |
| JP | 2011138219 A | 7/2011 |
| JP | 2012212380 A | 11/2012 |
| KR | 20060033067 A | 4/2006 |
| NO | 2009017231 A2 | 2/2009 |
| TW | 200937198 A | 9/2009 |
| TW | 201129817 A | 9/2011 |
| TW | 201239618 A | 10/2012 |
| WO | 2006012375 | 2/2006 |
| WO | 2010048502 | 4/2010 |
| WO | WO-2010126416 A1 | 11/2010 |
| WO | WO-2011147580 A1 | 12/2011 |
| WO | WO-2013016692 | 1/2013 |
| WO | 2013080096 A1 | 6/2013 |
| WO | 2013172865 A1 | 11/2013 |
| WO | 2013173003 A2 | 11/2013 |
| WO | 2013173044 A2 | 11/2013 |

OTHER PUBLICATIONS

Kolter, Jeremy Z., and Marcus A. Maloof. "Learning to detect malicious executables in the wild." Proceedings of the tenth ACM SIGKDD international conference on Knowledge discovery and data mining. ACM, 2004.*

Pang-Ning, Tan, Michael Steinbach, and Vipin Kumar. "Introduction to data mining." Library of Congress. 2006. Chapter 4.*

Kaspersky Endpoint Security 8 for Smartphone Implementation Guide Program Version: 8.0, Feb. 8, 2012.*

Lee, Wenke, Salvatore J. Stolfo, and Kui W. Mok. "A data mining framework for building intrusion detection models." In Security and Privacy, 1999. Proceedings of the 1999 IEEE Symposium on, pp. 120-132. IEEE, 1999.*

Shabtai, Asaf, et al. ""Andromaly": a behavioral malware detection framework for android devices." Journal of Intelligent Information Systems 38.1 (2012): 161-190.*

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

Lu Y. B., et al., "Using Multi-Feature and Classifier Ensembles to Improve Malware Detection", Journal of Chung Cheng Institute of Technology, vol. 39, No. 2, Nov. 2010 (Nov. 2010), pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012 (Apr. 2012), pp. 349-358, XP55086347, ISSN: 2249-955.

Qin F., "System Support for Improving Software Dependability During Production Runs," Urbana, Illinois, 1998, pp. 1-116.

Shabta A., "Malware Detection on Mobile Devices", Proceedings of the 11th International Conference on Mobile Data Management, (MDM'2010), May 23, 2010 (May 23, 2010), pp. 289-290, XP031692994, DOI: 10.1109/MDM.2010.28.

Shabtai A., et al., "Dectecting unknown malicious code by applying classification techniques on OpCode patterns," Security Informatics a Springer Open Journal, 2012, vol. 1 (1), pp. 1-22.

Sheen S., et al., "Network Intrusion Detection using Feature Selection and Decision tree classifier," TENCON—IEEE Region 10 Conference, 2008, pp. 1-4.

Wang Y-M., et al., "STRIDER: A Black-Box, State-based Approach to Change and Configuration Management and Support," 2003 LISA XVII—Oct. 26-31, 2003—San Diego, CA, pp. 165-178.

Shabtai A., et al., "a Andromalya: a behavioral malware detection framework for android devices", Journal of Intelligent Information Systems, Kluwer Academic Publishers, BO, vol. 38, No. 1, Jan. 6, 2011 (Jan. 6, 2011), pp. 161-190, XP019998836, ISSN: 1573-7675, DOI: 10.1007/S10844-010-0148-X paragraph [5.3.1]-paragraph [5.3.4].

Abu-Nimeh S., "Phishing detection using distributed Bayesian additive regression trees", Dec. 13, 2008 (Dec. 13, 2008), Southern Methodist University, 28 pages, XP055107295, ISBN: 9780549908630 chapters 2, 4, 6 and 8.

Chekina L., et al., "Detection of deviations in mobile applications network behavior", arXiv:1208.0564v2, Aug. 5, 2012 (Aug. 5, 2012), 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2, Feb. 7, 2010 (Feb. 7, 2010), pp. 131-146, XP019789345, DOI: 10.1007/S10710-010-9101-6 the whole document.

Gao J., et al., "Adaptive distributed intrusion detection using parametric model", Proceedings of the 2009 IEEE/WIC/ACM International Joint Conferences on Web Intelligence and Intelligent

(56) References Cited

OTHER PUBLICATIONS

Agent Technologies (WI-IAT'09), vol. 1, Sep. 15, 2009 (Sep. 15, 2009), pp. 675-678, XP055107983, DOI: 10.1109/WI-IAT.2009.113 the whole document.
Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007 (Nov. 5, 2007), pp. 516-520, XP031200055, DOI: 10.1109/WI-IATW.2007.52 the whole document.
Kachirski O., et al., "Effective Intrusion Detection Using Windows Sensors in Wireless Ad Hoc Networks", IEEE Proceedings of the 36th Hawaii International Conference on System Sciences, 2002, 8 pages.
Kirda E., et al., "Behavior-Based Spyware Detection", 15th USENIX Security Symposium, 2002, pp. 273-288.
Miluzzo E., et al., "Vision: mClouds—computing on clouds of mobile devices", Proceedings of the 3rd ACM Workshop on Mobile Cloud Computing and Services (MCS'12), Jun. 25, 2012 (Jun. 25, 2012), pp. 9-14, XP055107956, DOI: 10.1145/2307849.2307854 the whole document.
Schmidt A.D., et al., "Static analysis of executables for collaborative malware detection on android", Proceedings of the 2009 IEEE International Conference on Communications (ICC'09), Jun. 14, 2009 (Jun. 14, 2009), 3 Pages, XP031506460, DOI: 10.1109/ICC.2009.5199486 the whole document.
Shamili A.S., et al., "Malware detection on mobile devices using distributed machine learning", Proceedings of the 20th International Conference on Pattern Recognition (ICPR'10), Aug. 23, 2010 (Aug. 23, 2010), pp. 4348-4351, XP031772702, DOI: 10.1109/ICPR.2010.1057 the whole document.
Tabish S.M., "Malware detection using statistical analysis of byte-level file content", Proceedings of the ACM SIGKDD Workshop on Cybersecurity and Intelligence Informatics (CSI-KDD'09), Jun. 28, 2009 (Jun. 28, 2009), pp. 23-31, XP055107225, DOI: 10.1145/1599272.1599278 the whole document.
De Stefano C., et al., "Pruning GP-Based Classifier Ensembles by Bayesian Networks," Lecture Notes in Computer Science, Sep. 1, 2012 (Sep. 1, 2012), pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al., "Reducing Feature Models to Improve Runtime Adaptivity on Resource Limited Devices," Proceedings of the 16th International Software Product Line Conference (SPLC), Sep. 2, 2012 (Sep. 2, 2012), vol. 11, pp. 135-142, XP058009814, DOI: 10.1145/2364412.2364435, Section 5.
Gavin McWilliams: "Malware detection methods for fixed and mobile networks", Centre for Secure Information Technologies—Queen's University Belfast, Jan. 23, 2013 (Jan. 23, 2013), pp. 1-21, XP017577639, [retrieved on Jan. 23, 2013] the whole document.
Jarle Kittilsen: "Detecting malicious PDF documents", Dec. 1, 2011 (Dec. 1, 2011), pp. 1-112, XP055947997, Gjovik, Norway Retrieved from the Internet: URL:http:f/brage.bibsys.no/hig/retrieve/21 28/JarleKittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013 (Mar. 25, 2013), pp. 121-128, XP032678454, ISSN: 1550-445X, DOI: 10.1109/AINA.2013.88 ISBN: 978-1-4673-5550-6 [retrived on Jun. 13, 2013] the whole document.
Kolter J.Z., et al., "Learning to Detect Malicious Executables in the Wild", ACM Knowl. Discovery and Data Mining (KDD), 2004, pp. 470-478.
Taiwan Search Report—TW103100075—TIPO—Aug. 10, 2015.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X. DOI:10.1007/s11036-008-0113-x.
Lee., et al., "A Data Mining Framework for Building Intrusion Detection Models", Published in: Proceedings of the 1999 IEEE Symposium on Security and Privacy, 1999. Backspace, Conference Location: Oakland, CA, Date of Conference: 1999, pp. 120-132, Meeting Date: May 9, 1999-May 12, 1999.
Voulgaris., et al., "Dimensionality Reduction for Feature and Pattern Selection in Classification Problems", Published in:, 2008. ICCGI '08. The Third International Multi-Conference on Computing in the Global Information Technology, Conference Location: Athens Date of Conference: Jul. 27, 2008-Aug. 1, 2008, pp. 160-165.
Faddoul J.B., et al., "Boosting Multi-Task Weak Learners with Applications to Textual and Social Data," Ninth International Conference on Machine Learning and Applications (ICMLA), Dec. 2010, pp. 367-372.
Niculescu-Mizil A., et al., "Predicting Good Probabilities with Supervised Learning", Proceedings/Twenty-Second International Conference on Machine Learning, Bonn, Germany, Aug. 7-11, 2005, Association for Computing Machinery, New York, Aug. 7, 2005 (Aug. 7, 2005), pp. 625-632, XP058203964,DOI: 10.1145/1102351.11 024301SBN: 978-1-59593-180-1.
Hu W., et al., "Online Adaboost-Based Parameterized Methods for Dynamic Distributed Network Intrusion Detection", IEEE Transactions on Cybernetics, vol. 44, No. 1, Mar. 27, 2013 (Mar. 27, 2013), pp. 66-82, XP011533908, DOI: 10.1109/TCYB.2013.2247592.
Jean E., et al., "Addressing Mobile Agent Security Through Agent Collaboration", Journal of Information Processing Systems, vol. 3, No. 2, Dec. 2007 (Dec. 2007), pp. 43-53, XP055341844, DOI: 10.3745/JIPS.20083.2.043.

* cited by examiner

METHODS AND SYSTEMS OF DYNAMICALLY GENERATING AND USING DEVICE-SPECIFIC AND DEVICE-STATE-SPECIFIC CLASSIFIER MODELS FOR THE EFFICIENT CLASSIFICATION OF MOBILE DEVICE BEHAVIORS

RELATED APPLICATIONS

This application claims the benefit of priority to U.S. Provisional Application No. 61/874,109, entitled "Dynamic Device-Specific and Device-State-Specific Classifier" filed Sep. 5, 2013; U.S. Provisional Application No. 61/874,129, entitled "Methods and Systems of Using Boosted Decision Stumps and Joint Feature Selection and Pruning Algorithms for the Efficient Classification of Mobile Device Behaviors" filed Sep. 5, 2013; U.S. Provisional Patent Application No. 61/748,217 entitled "On-Device Real-Time Behavior Analyzer" filed Jan. 2, 2013; and U.S. Provisional Patent Application No. 61/748,220 entitled "Architecture for Client-Cloud Behavior Analyzer" filed Jan. 2, 2013, the entire contents of all of which are hereby incorporated by reference.

BACKGROUND

Cellular and wireless communication technologies have seen explosive growth over the past several years. This growth has been fueled by better communications, hardware, larger networks, and more reliable protocols. As a result wireless service providers are now able to offer their customers with unprecedented levels of access to information, resources, and communications.

To keep pace with these service enhancements, mobile electronic devices (e.g., cellular phones, tablets, laptops, etc.) have become more powerful and complex than ever. This complexity has created new opportunities for malicious software, software conflicts, hardware faults, and other similar errors or phenomena to negatively impact a mobile device's long-term and continued performance and power utilization levels. Accordingly, identifying and correcting the conditions and/or mobile device behaviors that may negatively impact the mobile device's long term and continued performance and power utilization levels is beneficial to consumers.

SUMMARY

The various aspects include methods of generating data models in a mobile device, including receiving in a processor of the mobile device a full classifier model that identifies a plurality of test conditions, using device-specific information of the mobile device to identify mobile device-specific test conditions in the plurality of test conditions that are relevant to classifying a behavior of the mobile device, generating in the mobile device a lean classifier model that includes only the identified mobile device-specific test conditions, and using the generated lean classifier model in the mobile device to classify the behavior of the mobile device.

In an aspect, receiving the full classifier model that identifies the plurality of test conditions may include receiving a finite state machine that includes information that is suitable for conversion a plurality of decision nodes that each evaluate one of the plurality of test conditions, and generating the lean classifier model that includes only the identified mobile device-specific test conditions includes generating the lean classifier model to include only the decision nodes that evaluate a mobile device feature that is relevant to a current operating state or configuration of the mobile device. In a further aspect, generating the lean classifier model to include only the decision nodes that evaluate a mobile device feature that is relevant to a current operating state or configuration of the mobile device may include determining a number of unique test conditions that should be evaluated to classify the behavior without consuming an excessive amount of processing, memory, or energy resources of the mobile device, generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions, and generating the lean classifier model to include the decision nodes in the full classifier model that test one of the conditions included in the generated list of test conditions.

In a further aspect, using the generated lean classifier model in the mobile device to classify the behavior of the mobile device may include using the lean classifier model to classify the behavior as being either benign or not benign by applying collected behavior information to each decision node in the lean classifier model, computing a weighted average of the results of applying the collected behavior information to each decision node in the lean classifier model, and comparing the weighted average to a threshold value. In a further aspect, the method may include monitoring the mobile device to detect a change in one of a state of the mobile device, a configuration of the mobile device, a capability of the mobile device, and a functionality of the mobile device, modifying the lean classifier model to include an updated set of test conditions in response to detecting the, and using the modified lean classifier model to classify the behavior of the mobile device.

In a further aspect, monitoring the mobile device to detect a change and modifying the lean classifier model to include an updated set of test conditions in response to detecting the change may include identifying an threshold value added mobile device feature associated with the detected change, determining whether the identified feature is included in the generated lean classifier model, and adding the identified feature to the generated lean classifier model in response to determining that the identified feature is not included in the generated lean classifier model.

In a further aspect, monitoring the mobile device to detect a change and modifying the lean classifier model to include an updated set of test conditions in response to detecting the change may include detecting a change in the capability of the mobile device by detecting an addition of an auxiliary component to the mobile device, determining whether the lean classifier model includes any test conditions that evaluate the added component, determining whether the full classifier model includes any test conditions for the added component in response to determining that the lean classifier model does not include any test conditions that evaluate the added component, and adding a test condition for the added component to the lean classifier model in response to determining that the full classifier model includes a test condition for the added component.

In a further aspect, monitoring the mobile device to detect a change and modifying the lean classifier model to include an updated set of test conditions in response to detecting the change may include detecting the change in the functionality of the mobile device, determining whether the detected change in functionality represents added or removed functionality, determining whether the lean classifier model includes any test conditions that evaluate a mobile device feature affected by the detected change in functionality in response to determining that the detected change in functionality represents added functionality, determining whether the full classifier model includes any test conditions that evaluate the mobile device feature in response to determining that the lean classifier model does not include any test conditions that evaluate the mobile device feature, and adding a test condition that evaluates the mobile device feature affected by the detected change to the lean classifier model in response to determining that the full classifier model includes test conditions that evaluate the mobile device feature.

In a further aspect, monitoring the mobile device to detect a change and modifying the lean classifier model to include an updated set of test conditions in response to detecting the change may include determining whether there has been a change in state on the mobile device, identifying a feature that is relevant to a previous state of the mobile device and not relevant to a current state of the mobile device in response to determining that there has been a change in state on the mobile device, and removing from the lean classifier model test conditions associated with the identified feature.

Further aspects include a mobile device, including a processor configured with processor-executable instructions to perform operations including receiving a full classifier model that identifies a plurality of test conditions, using device-specific information of the mobile device to identify mobile device-specific test conditions in the plurality of test conditions that are relevant to classifying a behavior of the mobile device, generating a lean classifier model that includes only the identified mobile device-specific test conditions, and using the generated lean classifier model in the mobile device to classify the behavior of the mobile device.

In an aspect, the processor may be configured with processor-executable instructions to perform operations such that receiving the full classifier model that identifies the plurality of test conditions may include receiving a finite state machine that includes information that is suitable for conversion a plurality of decision nodes that each evaluate one of the plurality of test conditions, and generating the lean classifier model that includes only the identified mobile device-specific test conditions includes generating the lean classifier model to include only the decision nodes that evaluate a mobile device feature that is relevant to a current operating state or configuration of the mobile device.

In a further aspect, the processor may be configured with processor-executable instructions to perform operations such that generating the lean classifier model to include only the decision nodes that evaluate a mobile device feature that is relevant to a current operating state or configuration of the mobile device may include determining a number of unique test conditions that should be evaluated to classify the behavior without consuming an excessive amount of processing, memory, or energy resources of the mobile device, generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions, and generating the lean classifier model to include the decision nodes in the full classifier model that test one of the conditions included in the generated list of test conditions.

In a further aspect, the processor may be configured with processor-executable instructions to perform operations such that using the generated lean classifier model in the mobile device to classify the behavior of the mobile device may include using the lean classifier model to classify the behavior as being either benign or not benign by applying collected behavior information to each decision node in the lean classifier model, computing a weighted average of the results of applying the collected behavior information to each decision node in the lean classifier model, and comparing the weighted average to a threshold value.

In a further aspect, the processor may be configured with processor-executable instructions to perform operations further including monitoring the mobile device to detect a change in one of a state of the mobile device, a configuration of the mobile device, a capability of the mobile device, and a functionality of the mobile device, modifying the lean classifier model to include an updated set of test conditions in response to detecting the, and using the modified lean classifier model to classify the behavior of the mobile device.

In a further aspect, the processor may be configured with processor-executable instructions to perform operations such that monitoring the mobile device to detect a change and modifying the lean classifier model to include an updated set of test conditions in response to detecting the change may include identifying an added mobile device feature associated with the detected change, determining whether the identified feature is included in the generated lean classifier model, and adding the identified feature to the generated lean classifier model in response to determining that the identified feature is not included in the generated lean classifier model.

In a further aspect, the processor may be configured with processor-executable instructions to perform operations such that monitoring the mobile device to detect a change and modifying the lean classifier model to include an updated set of test conditions in response to detecting the change may include detecting a change in the capability of the mobile device by detecting an addition of an auxiliary component to the mobile device, determining whether the lean classifier model includes any test conditions that evaluate the added component, determining whether the full classifier model includes any test conditions for the added component in response to determining that the lean classifier model does not include any test conditions that evaluate the added component, and adding a test condition for the added component to the lean classifier model in response to determining that the full classifier model includes a test condition for the added component.

In a further aspect, the processor may be configured with processor-executable instructions to perform operations such that monitoring the mobile device to detect a change and modifying the lean classifier model to include an updated set of test conditions in response to detecting the change may include detecting the change in the functionality of the mobile device, determining whether the detected change in functionality represents added or removed functionality, determining whether the lean classifier model includes any test conditions that evaluate a mobile device feature affected by the detected change in functionality in response to determining that the detected change in functionality represents added functionality, determining whether the full classifier model includes any test conditions that evaluate the mobile device feature in response to determining that the lean classifier model does not include any test conditions that evaluate the mobile device feature, and adding a test condition that evaluates the mobile device feature affected by the detected change to the lean classifier model in response to determining that the full classifier model includes test conditions that evaluate the mobile device feature.

In a further aspect, the processor may be configured with processor-executable instructions to perform operations such that monitoring the mobile device to detect a change and modifying the lean classifier model to include an updated set of test conditions in response to detecting the change may include determining whether there has been a change in state on the mobile device, identifying a feature that is relevant to a previous state of the mobile device and not relevant to a current state of the mobile device in response to determining that there has been a change in state on the mobile device, and removing from the lean classifier model test conditions associated with the identified feature.

Further aspects include a non-transitory computer readable storage medium having stored thereon processor-executable software instructions configured to cause a processor of a mobile device to perform operations including receiving in a processor of the mobile device a full classifier model that identifies a plurality of test conditions, using device-specific information of the mobile device to identify mobile device-specific test conditions in the plurality of test conditions that are relevant to classifying a behavior of the mobile device, generating in the mobile device a lean classifier model that includes only the identified mobile device-specific test conditions, and using the generated lean classifier model in the mobile device to classify the behavior of the mobile device.

In an aspect, the stored processor-executable software instructions may be configured to cause a processor to perform operations such that receiving the full classifier model that identifies the plurality of test conditions may include receiving a finite state machine that includes information that is suitable for conversion a plurality of decision nodes that each evaluate one of the plurality of test conditions, and generating the lean classifier model that includes only the identified mobile device-specific test conditions includes generating the lean classifier model to include only the decision nodes that evaluate a mobile device feature that is relevant to a current operating state or configuration of the mobile device.

In a further aspect, the stored processor-executable software instructions may be configured to cause a processor to perform operations such that generating the lean classifier model to include only the decision nodes that evaluate a mobile device feature that is relevant to a current operating state or configuration of the mobile device may include determining a number of unique test conditions that should be evaluated to classify the behavior without consuming an excessive amount of processing, memory, or energy resources of the mobile device, generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions, and generating the lean classifier model to include the decision nodes in the full classifier model that test one of the conditions included in the generated list of test conditions.

In a further aspect, the stored processor-executable software instructions may be configured to cause a processor to perform operations such that using the generated lean classifier model in the mobile device to classify the behavior of the mobile device may include using the lean classifier model to classify the behavior as being either benign or not benign by applying collected behavior information to each decision node in the lean classifier model, computing a weighted average of the results of applying the collected behavior information to each decision node in the lean classifier model, and comparing the weighted average to a threshold value. In a further aspect, the stored processor-executable software instructions may be configured to cause a processor to perform operations further including monitoring the mobile device to detect a change in one of a state of the mobile device, a configuration of the mobile device, a capability of the mobile device, and a functionality of the mobile device, modifying the lean classifier model to include an updated set of test conditions in response to detecting the, and using the modified lean classifier model to classify the behavior of the mobile device.

In a further aspect, the stored processor-executable software instructions may be configured to cause a processor to perform operations such that monitoring the mobile device to detect a change and modifying the lean classifier model to include an updated set of test conditions in response to detecting the change may include identifying an added mobile device feature associated with the detected change, determining whether the identified feature is included in the generated lean classifier model, and adding the identified feature to the generated lean classifier model in response to determining that the identified feature is not included in the generated lean classifier model.

In a further aspect, the stored processor-executable software instructions may be configured to cause a processor to perform operations such that monitoring the mobile device to detect a change and modifying the lean classifier model to include an updated set of test conditions in response to detecting the change may include detecting a change in the capability of the mobile device by detecting an addition of an auxiliary component to the mobile device, determining whether the lean classifier model includes any test conditions that evaluate the added component, determining whether the full classifier model includes any test conditions for the added component in response to determining that the lean classifier model does not include any test conditions that evaluate the added component, and adding a test condition for the added component to the lean classifier model in response to determining that the full classifier model includes a test condition for the added component.

In a further aspect, the stored processor-executable software instructions may be configured to cause a processor to perform operations such that monitoring the mobile device to detect a change and modifying the lean classifier model to include an updated set of test conditions in response to detecting the change may include detecting the change in the functionality of the mobile device, determining whether the detected change in functionality represents added or removed functionality, determining whether the lean classifier model includes any test conditions that evaluate a mobile device feature affected by the detected change in functionality in response to determining that the detected change in functionality represents added functionality, determining whether the full classifier model includes any test conditions that evaluate the mobile device feature in response to determining that the lean classifier model does not include any test conditions that evaluate the mobile device feature, and adding a test condition that evaluates the mobile device feature affected by the detected change to the lean classifier model in response to determining that the full classifier model includes test conditions that evaluate the mobile device feature.

In a further aspect, the stored processor-executable software instructions may be configured to cause a processor to perform operations such that monitoring the mobile device to detect a change and modifying the lean classifier model to include an updated set of test conditions in response to detecting the change may include determining whether there has been a change in state on the mobile device, identifying a feature that is relevant to a previous state of the mobile device and not relevant to a current state of the mobile device in response to determining that there has been a change in state on the mobile device, and removing from the lean classifier model test conditions associated with the identified feature.

A further aspect includes a mobile device having means for performing the functions of the methods described above. The mobile device may include means for receiving a full classifier model that identifies a plurality of test conditions, means for using device-specific information of the mobile device to identify mobile device-specific test conditions in the plurality of test conditions that are relevant to classifying a behavior of the mobile device, means for generating a lean classifier model that includes only the identified mobile device-specific test conditions, and means for using the generated lean classifier model in the mobile device to classify the behavior of the mobile device.

In an aspect, means for receiving the full classifier model that identifies the plurality of test conditions may include means for receiving a finite state machine that includes information that is suitable for conversion a plurality of decision nodes that each evaluate one of the plurality of test conditions. In a further aspect, means for generating the lean classifier model that includes only the identified mobile device-specific test conditions may include means for generating the lean classifier model to include only the decision nodes that evaluate a mobile device feature that is relevant to a current operating state or configuration of the mobile device.

In an aspect, means for generating the lean classifier model to include only the decision nodes that evaluate a mobile device feature that is relevant to the current operating state or configuration of the mobile device may include means for determining a number of unique test conditions that should be evaluated to classify the behavior without consuming an excessive amount of processing, memory, or energy resources of the mobile device, means for generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions, means for generating the lean classifier model to include the decision nodes in the full classifier model that test one of the conditions included in the generated list of test conditions.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

DETAILED DESCRIPTION

Figure 1:
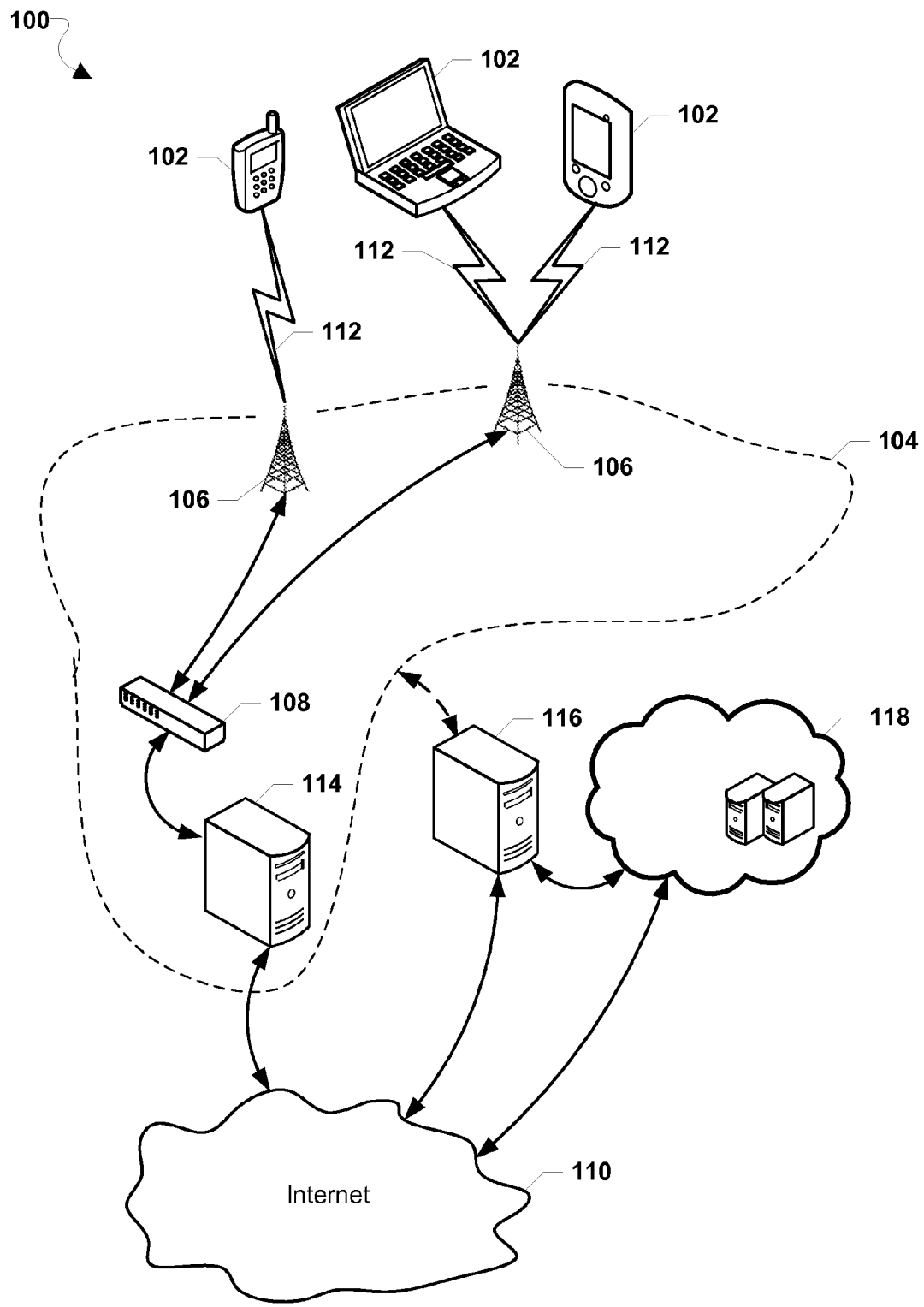
FIG. 1 is a communication system block diagram illustrating network components of an example telecommunication system that is suitable for use with the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Currently, various solutions exist for modeling the behavior an application program executing on a computing device, and these solutions may be used along with machine learning techniques to determine whether a software application is malicious or benign. However, these solutions are not suitable for use on mobile devices because they require evaluating a very large corpus of behavior information, do not generate behavior models dynamically, do not account for device-specific or device-state-specific features of the computing device, do not intelligently prioritize the features in the behavior model, are limited to evaluating an individual application program or process, and/or require the execution of computationally-intensive processes in the mobile device. As such, implementing or performing these existing solutions in a mobile device may have a significant negative and/or user-perceivable impact on the responsiveness, performance, or power consumption characteristics of the mobile device.

For example, a computing device may be configured to use an existing machine learning-based solution to access and use a large corpus of training data, derive a model that takes as input a feature vector, and use this model to determine whether a software application of the computing device is malicious or benign. However, such a solution does not generate a full classifier model (i.e., a robust data or behavior model) that describes the large corpus of behavior information in a format or information structure (e.g., finite state machine, etc.) that may be used by a mobile device to quickly generate a lean classifier model. For at least this reason, such a solution does not allow a mobile device to generate a lean classifier model that includes, tests, or accounts for device-specific or device-state-specific features. In addition, this solution does not allow a mobile device to generate a lean classifier model that intelligently identifies or prioritizes the features in accordance to their relevance to classifying a specific behavior in the specific mobile device in which the model is used. For these and other reasons, such a solution cannot be used by a mobile device processor to quickly and efficiently identify, analyze, or classify a complex mobile device behavior without having a significant negative or user-perceivable impact on the responsiveness, performance, or power consumption characteristics of the mobile device.

In addition to the above-mentioned limitations of existing solutions, many behavior modeling solutions implement a "one-size-fits-all" approach to modeling the behaviors of a computing device, and are therefore not suitable for use in mobile devices. That is, these solutions typically generate the behavior models so that they are generic and may be used in many computing devices and/or with a variety of different hardware and software configurations. As such, these generic behavior models often include/test a very large number of features, many of which are not relevant to (and thus cannot be used for) identifying, analyzing, or classifying a behavior in the specific computing device in which they are actually used. In addition, these solutions do not assign relative priorities to features based their relevance to classifying a specific behavior in the specific mobile device in which the model is used. Therefore, these solutions typically require that a computing device apply behavior models that include a large number of disorganized, improperly prioritized, or irrelevant features. Such models are not suitable for use in resource-constrained mobile devices because they may cause the mobile device processor to analyze a large number of features that are not useful for identifying a cause or source of the mobile device's degradation over time. As such, these existing solutions are not suitable for use in complex-yet resource-constrained mobile devices.

Modern mobile devices are highly configurable and complex systems. As such, the features that are most important for determining whether a particular mobile device behavior is benign or not benign (e.g., malicious or performance-degrading) may be different in each mobile device. Further, a different combination of features may require monitoring and/or analysis in each mobile device in order for that mobile device to quickly and efficiently determine whether a particular behavior is benign or not benign. Yet, the precise combination of features that require monitoring and analysis, and the relative priority or importance of each feature or feature combination, can often only be determined using device-specific information obtained from the specific mobile device in which a behavior is to be monitored or analyzed. For these and other reasons, behavior models generated in any computing device other than the specific device in which they are used cannot include information that identifies the precise combination of features that are most important to classifying a behavior in that device.

For example, if a first mobile device is configured to use its biometric sensors (e.g., fingerprint reader, voice recognition subsystem, retina scanner, etc.) to authorize financial transactions, then features that test conditions relating to the access and use of the biometric sensors are likely to be relevant in determining whether an observed behavior of accessing financial software is malicious or benign in that mobile device. For example, the access and use of the biometric sensors in the first mobile device may indicate that a malicious application is authorizing financial transactions without the user's knowledge or consent. On the other hand, features that test conditions relating to the access and use of these sensors are not likely to be relevant in determining whether the observed behavior of accessing financial software is malicious or benign in a second mobile device which is not configured to use its biometric sensors to authorize financial transactions. That is, since the first and second devices may be identical in all aspects (i.e., are the same type, model, operating system, software, etc.) except for their configuration for the use of their biometric sensors, it would be challenging to generate a generic behavior model that accurately identifies features that evaluate conditions relating to the access and use of the biometric sensors for both devices. It would be even more challenging to generate a generic model that tests much more complicated conditions or features on hundreds of thousands (or millions) of similarly equipment yet independently configurable mobile devices.

In overview, the various aspects overcome these limitations of current solutions by configuring network servers and mobile devices to work in conjunction with one another to efficiently identify, classify, model, prevent, and/or correct the conditions and/or mobile device behaviors that often degrade a mobile device's performance and/or power utilization levels over time. The network server may be configured to receive information on various conditions, features, behaviors and corrective actions from a central database (e.g., the "cloud"), and use this information to generate a full classifier model (i.e., a data or behavior model) that describes a large corpus of behavior information in a format or structure (e.g., finite state machine, etc.) that can be quickly converted into one or more lean classifier models by a mobile device.

In an aspect, the full classifier model may be a finite state machine description or representation of the large corpus of behavior information. In an aspect, the finite state machine may include information that is suitable for expression as a plurality of nodes, boosted decision trees, or decision stumps that each test one or more features. For example, the finite state machine may be an information structure that may be expressed as a family of boosted decision stumps that collectively identify, describe, test, or evaluate all or many of the features and data points that are relevant to determining whether a mobile device behavior is benign or contributing to that mobile device's degradation in performance over time. The network server may then send the full classifier model (i.e., information structure that includes the finite state machine and/or family of boosted decision stumps, etc.) to the mobile device.

The mobile device may be configured to receive and use the full classifier model to generate device-specific and/or device-state-specific lean classifier models or a family of lean classifier models of varying levels of complexity (or "leanness"). To accomplish this, the mobile device may prune or cull the robust family of boosted decision trees included in the full classifier model received from the network server (herein "full boosted decision tree classifier model") to generate a lean classifier model that includes a reduced number of boosted decision trees and/or evaluates a limited number of test conditions or features. The mobile device may then use this locally generated, device-specific and/or device-state-specific classifier models to perform real-time behavior monitoring and analysis operations and identify a source or a cause of an undesirable or performance degrading mobile device behavior.

By generating full classifier models that describe or express a large corpus of behavior information as a finite state machine, decision nodes, decision trees, or other similar information structures that can be modified, culled, augmented, or otherwise used to generate lean classifier models, the various aspects allow the mobile device to generate lean classifier models quickly, efficiently and without accessing training data or further communicating with the network server, the central database, or the cloud network/server. This significantly reduces the mobile device's dependence on the network, and improves the performance and power consumption characteristics of the mobile device.

Further, by generating the lean classifier models locally in the mobile device to account for device-specific or device-state-specific features, the various aspects allow the mobile device to focus its monitoring operations on the features or factors that are most important for identifying the source or cause of an undesirable or performance depredating mobile device behavior. This allows the mobile device to identify and respond to undesirable or performance degrading mobile device behaviors without causing a significant negative or user-perceivable change in the responsiveness, performance, or power consumption characteristics of the mobile device.

A number of different cellular and mobile communication services and standards are available or contemplated in the future, all of which may implement and benefit from the various aspects. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of voice, data, signaling, and/or content messages.

It should be understood that any references to terminology and/or technical details related to an individual telecommunication standard or technology are for illustrative purposes only, and are not intended to limit the scope of the claims to a particular communication system or technology unless specifically recited in the claim language.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems having a large variety of factors that may contribute to the degradation in performance and power utilization levels of the mobile device over time. Examples of factors that may contribute to performance degradation include poorly designed software applications, malware, viruses, fragmented memory, and background processes. Due to the number, variety, and complexity of these factors, it is often not feasible to evaluate all of the various components, behaviors, processes, operations, conditions, states, or features (or combinations thereof) that may degrade performance and/or power utilization levels of the complex yet resource-constrained systems of modern mobile devices. As such, it is difficult for users, operating systems, or application programs (e.g., anti-virus software, etc.) to accurately and efficiently identify the sources of such problems. As a result, mobile device users currently have few remedies for preventing the degradation in performance and power utilization levels of a mobile device over time, or for restoring an aging mobile device to its original performance and power utilization levels.

The various aspects also include a comprehensive behavioral monitoring and analysis system for intelligently and efficiently identifying, preventing, and/or correcting the conditions, factors, and/or mobile device behaviors that often degrade a mobile device's performance and/or power utilization levels over time. In an aspect, an observer process, daemon, module, or sub-system (herein collectively referred to as a "module") of the mobile device may instrument or coordinate various application programming interfaces (APIs), registers, counters or other components (herein collectively "instrumented components") at various levels of the mobile device system. The observer module may continuously (or near continuously) monitor mobile device behaviors by collecting behavior information from the instrumented component. The mobile device may also include an analyzer module, and the observer module may communicate (e.g., via a memory write operation, function call, etc.) the collected behavior information to the analyzer module. The analyzer module may receive and use the behavior information to generate behavior vectors, generate spatial and/or temporal correlations based on the behavior vectors, and use this information to determine whether a particular mobile device behavior, condition, sub-system, software application, or process is benign, suspicious, or not benign (i.e., malicious or performance-degrading). The mobile device may then use the results of this analysis to heal, cure, isolate, or otherwise fix or respond to identified problems.

The analyzer module may also be configured to perform real-time behavior analysis operations, which may include performing, executing, and/or applying data, algorithms, classifiers or models (herein collectively referred to as "classifier models") to the collected behavior information to determine whether a mobile device behavior is benign or not benign (e.g., malicious or performance-degrading). Each classifier model may be a behavior model that includes data and/or information structures (e.g., feature vectors, behavior vectors, component lists, etc.) that may be used by a mobile device processor to evaluate a specific feature or aspect of a mobile device's behavior. Each classifier model may also include decision criteria for monitoring a number of features, factors, data points, entries, APIs, states, conditions, behaviors, applications, processes, operations, components, etc. (herein collectively "features") in the mobile device. The classifier models may be preinstalled on the mobile device, downloaded or received from a network server, generated in the mobile device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular mobile device behavior is benign or not benign (e.g., malicious or performance-degrading).

As mentioned above, there may be thousands of features/factors and billions of data points that require analysis to properly identify the cause or source of a mobile device's degradation. Therefore, classifier models may be trained on a very large number of features in order to support all makes and models of mobile devices, and for each mobile device to make accurate decisions regarding whether a particular mobile device behavior is benign or not benign (e.g., malicious or performance-degrading). Yet, because mobile devices are resource constrained systems, it is often not feasible for the mobile device evaluate all these features. Further, mobile devices come in many different configurations and varieties, but few (if any) include every feature or functionality that may be addressed in full classifier models. The various aspects generate lean classifier models that the analyzer module may apply to evaluate a targeted subset of features that are most relevant to the mobile device, limiting the number of test conditions and analyses that would otherwise be performed if a full classifier mode was used when classifying a mobile device behavior.

The various aspects include mobile devices and network servers configured to work in conjunction with one another to intelligently and efficiently identify the features, factors, and data points that are most relevant to determining whether a mobile device behavior is benign or not benign (e.g., malicious or performance-degrading). By generating lean classifier models locally in the mobile device accounting for device-specific features and/or device-state-specific features, the various aspects allow the mobile device processor to apply focused classifier models to quickly and efficiently identify, analyze, or classify a complex mobile device behavior (e.g., via the observer and analyzer modules, etc.) without causing a significant negative or user-perceivable change in the responsiveness, performance, or power consumption characteristics of the mobile device.

A full classifier model may be generated by a network server configured to receive a large amount of information regarding mobile device behaviors and states, features, and conditions during or characterizing those behaviors from a cloud service/network. This information may be in the form of a very large cloud corpus of mobile device behavior vectors. The network server may use this information to generate a full classifier model (i.e., a robust data/behavior model) that accurately describes the very large cloud corpus of behavior vectors. The network server may generate the full classifier model to include all or most of the features, data points, and/or factors that could contribute to the degradation over time of any of a number of different makes, models and configurations of mobile devices.

In an aspect, the network server may generate the full classifier model to include a finite state machine expression or representation, such as a boosted decision tree/stump or family of boosted decision trees/stumps that can be quickly and efficiently culled, modified or converted into lean classifier models that are suitable for use or execution in a mobile device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a feature, condition, or aspect of a mobile device behavior.

The mobile device may be configured to receive a full classifier model from the network server, and use the received full classifier model to generate lean classifier models (i.e., data/behavior models) that are specific for the features and functionalities of the mobile device.

In various aspects, the mobile device may use behavior modeling and machine learning techniques to intelligently and dynamically generate the lean classifier models so that they account for device-specific and/or device-state-specific features of the mobile device (e.g., features relevant to the mobile device configuration, functionality, connected/included hardware, etc.), include, test or evaluate a focused and targeted subset of the features that are determined to be important for identifying a cause or source of the mobile device's degradation over time, and/or prioritize the targeted subset of features based on probability or confidence values identifying their relative importance for successfully classifying a behavior in the specific mobile device in which they are used/evaluated.

By generating classifier models in the mobile device in which the models are used, the various aspects allow the mobile device to accurately identify the specific features that are most important in determining whether a behavior on that specific mobile device is benign or contributing to that device degradation in performance. These aspects also allow the mobile device to accurately prioritize the features in the lean classifier models in accordance with their relative importance to classifying behaviors in that specific mobile device.

The use of device-specific or device-state-specific information allows the mobile device to quickly identify and prioritize the features that should be included in the lean classifier models, as well as to identify the features that should be excluded from the lean classifier models. For example, the mobile device may be configured to identify and exclude from the lean classifier models the features/ nodes/trees/stumps included in the full model that test conditions which do not or cannot exist in the mobile device based on its specific feature set, and therefore are not relevant to the mobile device. For example, a mobile device that does not include a biometric sensor may exclude from lean classifier models all features/nodes/stumps that test or evaluate conditions relating to the use of a biometric sensor.

Further, since the lean classifier models include a reduced subset of states, features, behaviors, or conditions that must be evaluated (i.e., compared to the full classifier model), the observer and/or analyzer modules may use the lean classifier model to quickly and accurately determine whether a mobile device behavior is benign or not benign (e.g., malicious or performance-degrading) without consuming an excessive amount of processing, memory, or energy resources of the mobile device.

In an aspect, the mobile device may be configured to use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the mobile device may be configured to generate one or more lean classifier models by converting a finite state machine representation/expression into boosted decision stumps, pruning or culling the full set of boosted decision stumps based on mobile device-specific states, features, behaviors, conditions, or configurations to include subset or subsets of boosted decision stumps included in the full classifier model, and using the subset or subsets of boosted decision stumps to intelligently monitor, analyze and/or classify a mobile device behavior.

The use of boosted decision stumps allows the observer and/or analyzer modules to generate and apply lean data models without communicating with the cloud or a network to re-train the data, which significantly reduces the mobile device's dependence on the network server and the cloud. This eliminates the feedback communications between the mobile device and the network server, which further improves the performance and power consumption characteristics of the mobile device.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the mobile device).

As described below, the network server (or another computing device) may generate a boosted decision stump-type full classifier model from another, more complex model of mobile device behaviors, such as a boosted decision tree model. Such complex models may correlate the full (or nearly full) set of interactions among device states, operations, and monitored nodes that characterize mobile device behavior in a sophisticated classification system. As mentioned above, the server or other computing device may generate a full, complex classifier model by applying machine learning techniques to generate models that describe a cloud corpus of behavior vectors of mobile devices collected from a large number of mobile devices. As an example, a boosted decision tree classifier model may trace hundreds of paths through decision nodes of testable conditions to arrive at a determination of whether a current mobile device behavior is malicious or benign. Such complex models may be generated in the server using a number of known learning and correlation modeling techniques. While such complex models can become quite effective in accurately recognizing malicious behaviors by learning from data from many hundreds of mobile devices, their application to a particular mobile device's configuration and behaviors may require significant processing, particularly if the model involves complex, multilevel decision trees. Since mobile devices are typically resource limited, using such models may impact device performance and battery life.

To render robust classifier models that are more conducive to use by mobile devices, a server (e.g., a cloud server or the network server) or another computing device (e.g., a mobile device or a computer that will couple to the mobile device) may transform complex classifier models into large boosted decision stump models. The more simple determinations involved in decision stumps and the ability to apply such classifier models in parallel processes may enable mobile devices to better benefit from the analyses performed by the network server. Also, as discussed below, a boosted decision stump full classifier model may be used by mobile devices to generate a lean classifier model to include (or exclude) features based on device-specific or device-state-specific information. This may be accomplished by configuring a mobile device processor to perform the aspect methods described below.

In further aspects, the mobile device may include various components configured to incorporate features specific to the mobile device or the mobile device's current state into a lean classifier model or a set of lean classifier models used to detect malicious behavior on the mobile device.

In an aspect, the mobile device may be configured to generate a lean classifier model to include a subset of classifier criteria included in the full classifier model and only those classifier criteria corresponding to the features relevant to the mobile device configuration, functionality and connected/included hardware. The mobile device may use this lean classifier model(s) to monitor only those features and functions present or relevant to the device. The mobile device may then periodically modify or regenerate the lean classifier model(s) to include or remove various features and corresponding classifier criteria based on the mobile device's current state and configuration.

As an example and in an aspect, a behavior analyzer module operating on the mobile device may receive a large boosted decision stumps classifier model with decision stumps associated with a full feature set of behavior models, and the behavior analyzer module may derive one or more lean classifier models from the large classifier models by selecting only features from the large classifier model(s) that are relevant the mobile device's current configuration, functionality, operating state and/or connected/included hardware, and including in the lean classifier model a subset of boosted decision stumps that correspond to the selected features. In this aspect, the classifier criteria corresponding to features relevant to the mobile device may be those boosted decision stumps included in the large classifier model that test at least one of the selected features. In an aspect, the behavior analyzer module may then periodically modify or regenerate the boosted decision stumps lean classifier model(s) to include or remove various features based on the mobile device's current state and configuration so that the lean classifier model continues to include device-specific feature boosted decision stumps.

In an aspect, a device state monitoring engine operating on the mobile computing device may continually monitor the mobile device for changes in the mobile device's configuration and/or state. In a further aspect, the device state monitoring engine may look for configuration and/or state changes that may impact the performance or effectiveness of the behavior analyzer module (or a classifier module) to detect malicious behavior. For example, the device state monitoring engine may monitor the mobile device's behaviors until a "low battery state" is detected, at which point the behavior analyzer module may change the lean classifier model to analyze fewer features on the mobile device for malicious behavior in order to conserve energy.

In another aspect, the device state monitoring engine may notify a device state specific feature generator when the device state monitoring engine detects a state change, and the device state specific feature generator may signal the behavior analyzer module to add or remove certain features based on the mobile device's state change.

In another aspect, the mobile device may include a device specific feature generator configured to determine features related to the mobile device itself. For example, the device-specific feature generator may determine that the mobile device includes near-field communication, Wi-Fi, and Bluetooth® capabilities. In a further aspect, the device-specific feature generator may signal the behavior analyzer to include or remove features in the lean classifier models based on the features related to the mobile device itself. Thus, various components on the mobile device may modify a lean classifier model to reflect features specific to the mobile device's configuration and/or to the mobile device's current state, which may enable the various components to better detect malicious behavior or improve the overall performance of the mobile device by prioritizing monitored features based on the mobile device's current state.

As noted above, one example of a type of large classifier model that may be processed by a mobile device to generate a lean classifier model for use in monitoring behavior is a boosted decision stumps classifier model. In the detailed descriptions that follow references may be made to boosted decision stumps classifier models; however, such references are for example purposes, and are not intended to limit the scope of the claims unless a claim explicitly recites a boosted decision stumps classifier model.

The various aspects may be implemented within a variety of communication systems, such as the example communication system 100 illustrated in FIG. 1. A typical cell telephone network 104 includes a plurality of cell base stations 106 coupled to a network operations center 108, which operates to connect voice calls and data between mobile devices 102 (e.g., cell phones, laptops, tablets, etc.) and other network destinations, such as via telephone land lines (e.g., a POTS network, not shown) and the Internet 110. Communications between the mobile devices 102 and the telephone network 104 may be accomplished via two-way wireless communication links 112, such as 4G, 3G, CDMA, TDMA, LTE and/or other cell telephone communication technologies. The telephone network 104 may also include one or more servers 114 coupled to or within the network operations center 108 that provide a connection to the Internet 110.

The communication system 100 may further include network servers 116 connected to the telephone network 104 and to the Internet 110. The connection between the network server 116 and the telephone network 104 may be through the Internet 110 or through a private network (as illustrated by the dashed arrows). The network server 116 may also be implemented as a server within the network infrastructure of a cloud service provider network 118. Communication between the network server 116 and the mobile devices 102 may be achieved through the telephone network 104, the internet 110, private network (not illustrated), or any combination thereof.

The network server 116 may send full classifier models to the mobile device 102, which may receive and use the full classifier models to identify suspicious or performance-degrading mobile device behaviors, software applications, processes, etc. The network server 116 may also send classification and modeling information to the mobile devices 102 to replace, update, create and/or maintain mobile device classification models. The mobile device 102 may receive and use the full classifier models to generate lean classifier models that are suitable for use in identifying suspicious or performance-degrading mobile device behaviors, software applications, processes, etc. The network server 116 may also send classification and modeling information to the mobile devices 102 to replace, update, create and/or maintain mobile device data/behavior models.

In an aspect, the mobile device 102 may be configured to use the collected behavioral, state, classification, modeling, success rate, and/or statistical information to generate, update or refine the lean classifier models (or data/behavior models) that include a further targeted and/or reduced subset of features in the mobile device 102. This reduces the amount of feedback communications between the mobile device and the network server 116, and improves the performance and power consumption characteristics of the mobile device 102.

Figure 2:
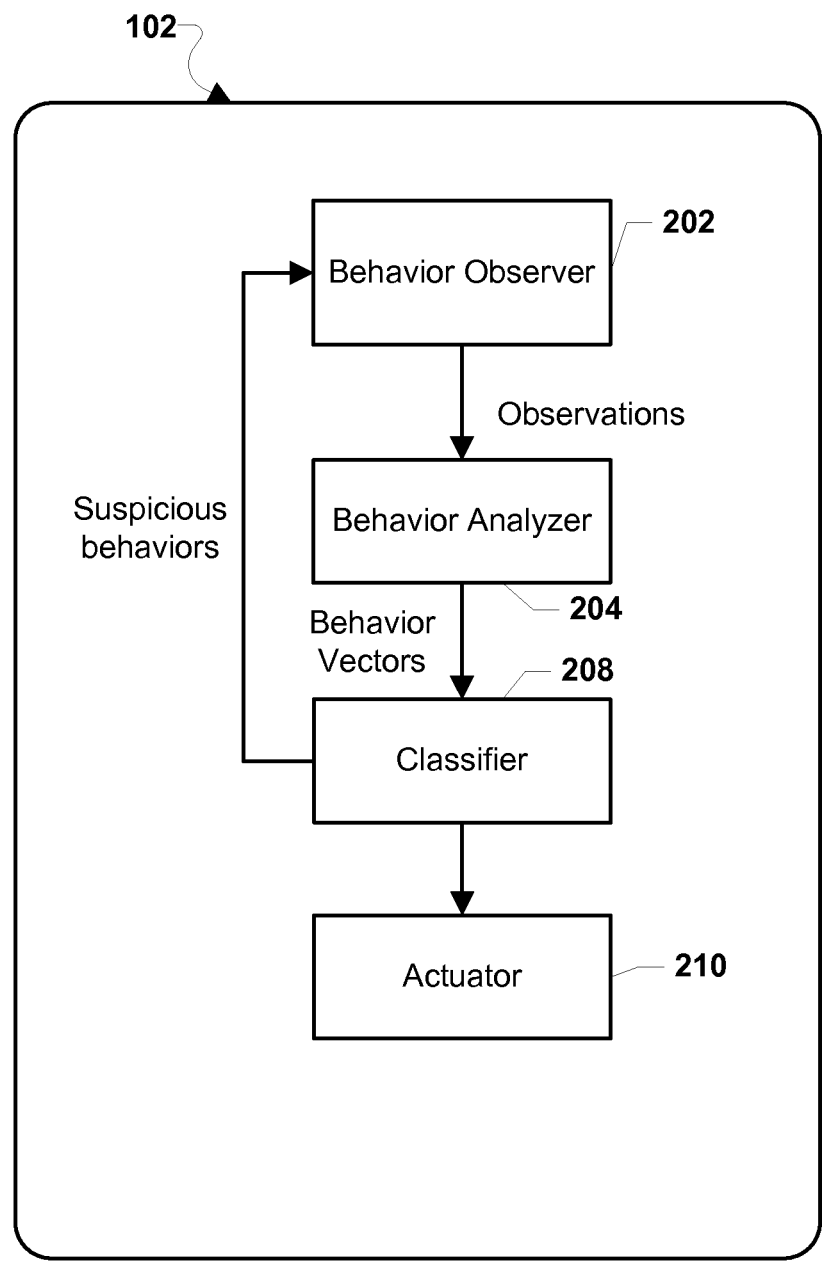
FIG. 2 is a block diagram illustrating example logical components and information flows in an aspect mobile device configured to determine whether a particular mobile device behavior is malicious, performance-degrading, suspicious, or benign.

FIG. 2 illustrates example logical components and information flows in an aspect mobile device 102 configured to determine whether a particular mobile device behavior, software application, or process is malicious/performance-degrading, suspicious, or benign. In the example illustrated in FIG. 2, the mobile device 102 includes a behavior observer module 202, a behavior analyzer module 204, a classifier module 208, and an actuator module 210. In an aspect, the classifier module 208 may be implemented as part of the behavior analyzer module 204. In an aspect, the behavior analyzer module 204 may be configured to generate one or more classifier modules 208, each of which may include one or more classifiers.

Each of the modules 202-210 may be implemented in software, hardware, or any combination thereof. In various aspects, the modules 202-210 may be implemented within parts of the operating system (e.g., within the kernel, in the kernel space, in the user space, etc.), within separate programs or applications, in specialized hardware buffers or processors, or any combination thereof. In an aspect, one or more of the modules 202-210 may be implemented as software instructions executing on one or more processors of the mobile device 102.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, and store the generated observations in a memory (e.g., in a log file, etc.) and/or send (e.g., via memory writes, function calls, etc.) the generated observations to the behavior analyzer module 204.

The behavior observer module 202 may monitor/observe mobile device operations and events by collecting information pertaining to library application programming interface (API) calls in an application framework or run-time libraries, system call APIs, file-system and networking subsystem operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth®, WiFi, etc.), content of text-based communications, content of recorded audio files, phonebook or contact information, contacts lists, etc.

The behavior observer module 202 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple subscriber identity module (SIM) cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth®, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting near-field communications (NFC), collecting information from a credit card scanner, barcode scanner, or mobile tag reader, detecting the presence of a universal serial bus (USB) power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer module 202 may perform coarse observations by monitoring/observing an initial set of behaviors or factors that are a small subset of all factors that could contribute to the mobile device's degradation. In an aspect, the behavior observer module 202 may receive the initial set of behaviors and/or factors from a network server 116 and/or a component in a cloud service or network 118. In an aspect, the initial set of behaviors/factors may be specified in data/behavior models received from the network server 116 or cloud service/network 118. In an aspect, the initial set of behaviors/factors may be specified in a reduced feature model (RFMs).

The behavior analyzer module 204 and/or classifier module 208 may receive the observations from the behavior observer module 202, compare the received information (i.e., observations) with contextual information received from the external modules, and identify subsystems, processes, and/or applications associated with the received observations that are contributing to (or are likely to contribute to) the device's degradation over time, or which may otherwise cause problems on the device.

In an aspect, the behavior analyzer module 204 and/or classifier module 208 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external modules, etc.), learn the normal operational behaviors of the mobile device, and generate one or more behavior vectors based the results of the comparisons. The behavior analyzer module 204 may send the generated behavior vectors to the classifier module 208 for further analysis.

The classifier module 208 may receive the behavior vectors and compare them to one or more behavior modules to determine whether a particular mobile device behavior, software application, or process is performance-degrading/malicious, benign, or suspicious.

When the classifier module 208 determines that a behavior, software application, or process is malicious or performance-degrading, the classifier module 208 may notify the actuator module 210, which may perform various actions or operations to correct mobile device behaviors determined to be malicious or performance-degrading and/or perform operations to heal, cure, isolate, or otherwise fix the identified problem.

When the classifier module 208 determines that a behavior, software application, or process is suspicious, the classifier module 208 may notify the behavior observer module 202, which may adjust the adjust the granularity of its observations (i.e., the level of detail at which mobile device behaviors are observed) and/or change the behaviors that are observed based on information received from the classifier module 208 (e.g., results of the real-time analysis operations), generate or collect new or additional behavior information, and send the new/additional information to the behavior analyzer module 204 and/or classifier module 208 for further analysis/classification. Such feedback communications between the behavior observer module 202 and the classifier module 208 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

In an aspect, the behavior observer module 202 and the behavior analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 202 enables the mobile device 102 to efficiently identify and prevent problems from occurring on mobile devices without requiring a large amount of processor, memory, or battery resources on the device.

Figure 3:
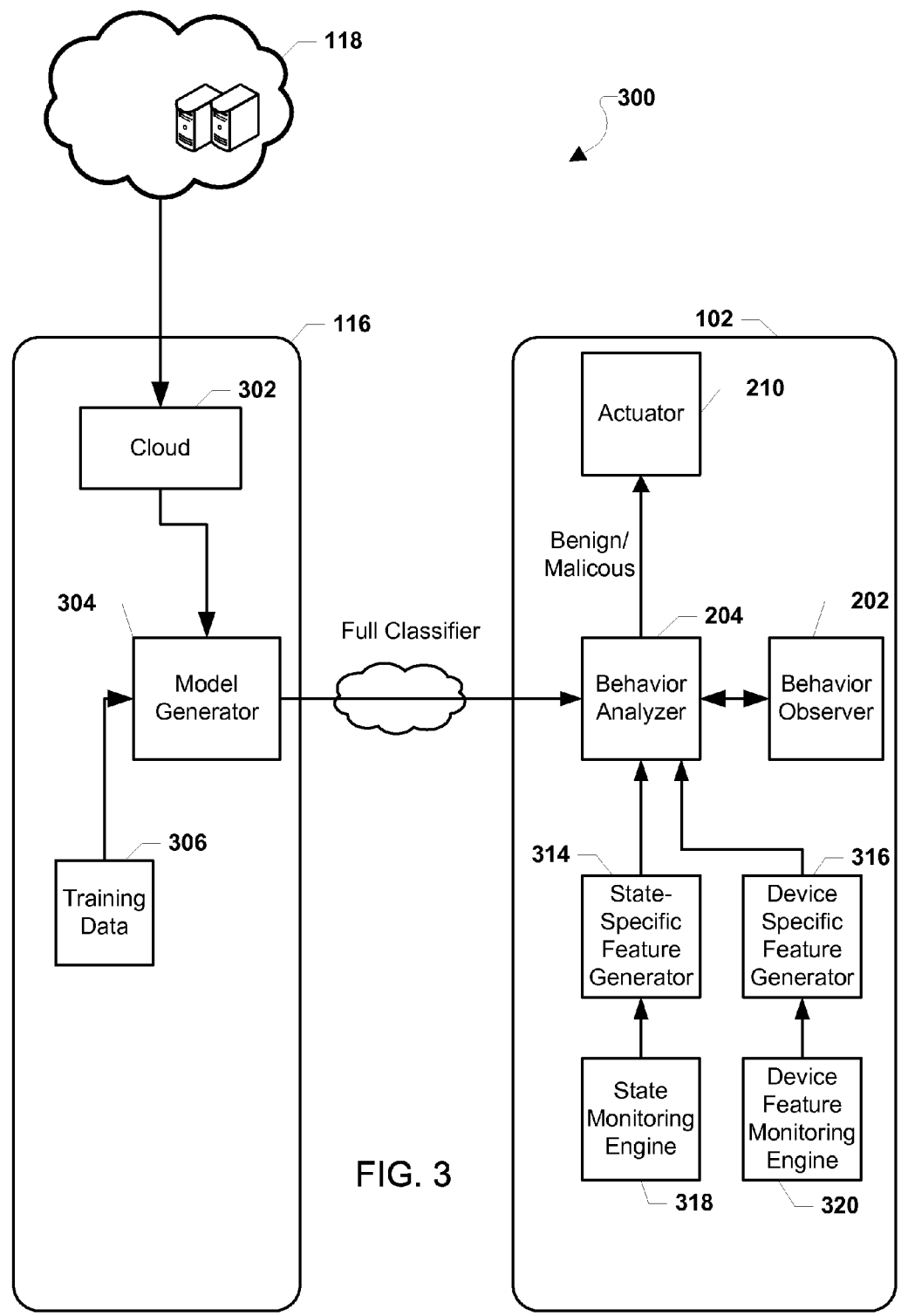
FIG. 3 is a block diagram illustrating example components and information flows in an aspect system that includes a network server configured to work in conjunction with a mobile device configured to generate a targeted and lean classifier model from a full classifier model and use the lean classifier model to determine whether a particular mobile device behavior is malicious, performance-degrading, suspicious, or benign.

FIG. 3 illustrates example components and information flows in an aspect system 300 that includes a mobile device 102 configured to work in conjunction with a network server 116 to intelligently and efficiently identify actively malicious or poorly written software applications and/or suspicious or performance-degrading mobile device behaviors on the mobile device 102 without consuming an excessive amount of processing, memory, or energy resources of the mobile device.

In the example illustrated in FIG. 3, the network server 116 includes a cloud module 302, a model generator 304 module, and a training data module 306. The mobile device 102 includes a behavior observer module 202, a analyzer module 204, an actuator module 210, a state monitoring engine 312, a state-specific feature generator 314, a device-specific feature generator 316, and a device-feature monitoring engine 318. In various aspects, the state monitoring engine 312, state-specific feature generator 314, device-specific feature generator 316, and/or device-feature monitoring engine 318 may be included, or implemented as part of, the behavior analyzer module 204 or as part of a classifier module 208 (not illustrated in FIG. 3).

The cloud module 302 may be configured to receive a large amount of information from a cloud service/network 118 that includes all or most of the features, data points, and/or factors that could contribute to the mobile device's degradation over time.

The model generator 304 may use the information received in the cloud module 302 and training data (e.g., via the training data module 306) to generate a full or robust classifier model that includes or identifies all or most of the features, data points, and/or factors that could contribute to the mobile device's degradation over time.

In various aspects, the network server 116 may be configured to generate the full classifier model by performing, executing, and/or applying machine learning and/or context modeling techniques to behavior information and/or the results of behavior analyses provided by many mobile devices or other information received from the cloud service/network 118. Thus, the network server 116 may receive a large number of reports from many mobile devices and analyze, consolidate or otherwise turn such crowd-sourced information into useable information, particularly behavior models that may be used or accessed by all mobile devices. The network server 116 may continuously reevaluate existing behavior models as new behavior/analysis reports are received from mobile devices, and/or generate new or updated behavior models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the model generator 304 may generate the full classifier model to include a finite state machine representation, such as a boosted decision stump or family of boosted decision stumps that can be quickly and efficiently culled, modified or converted into lean classifier models that are suitable for use or execution in a mobile device processor. The finite state machine expression or representation may be an information structure that includes test conditions, state information, state-transition rules, and other similar information. In an aspect, the finite state machine expression or representation may be an information structure that includes a large or robust family of boosted decision stumps that each evaluate or test a condition, feature, factor, or aspect of a behavior of the mobile device.

The model generator 304 module may send the full classifier module to the mobile device 102 which may be configured to generate lean data/behavior models based on full model generated in the cloud module 302. In an aspect, the mobile device 102 may be configured to use the full classifier model to generate a family of lean classifier models of varying levels of complexity (or "leanness").

In an aspect, generating the lean data/behavior models may include generating one or more reduced feature models (RFMs) that include a subset of the features and data points included in the full model generated in the network server 112. In an aspect, the mobile device may generate a lean data/behavior model that includes an initial feature set (e.g., an initial reduced feature model) that includes information determined to have a highest probability of enabling the behavior analyzer module 204 to conclusively determine whether a particular mobile device behavior is benign or malicious/performance-degrading.

In an aspect, the mobile device 102 may be configured to cull a family of boosted decision stumps included in the full classifier model received from the network server 112 to generate a lean classifier model that includes a reduced number of boosted decision stumps and/or evaluates a limited number of test conditions. This culling of the full boosted decision stumps classifier model may be accomplished by: selecting a boosted decision stump; identifying all other boosted decision stumps that depend upon the same mobile device-specific state, feature, behavior, or condition as the selected decision stump (and thus can be applied based upon one determination result); including in the lean classifier model the selected and all identified other boosted decision stumps that depend upon the same mobile device-specific state, feature, behavior, or condition; and repeating the process for a limited number of selected boosted decision stumps not already included in the lean classifier model. In this manner, a lean classifier model may be generated that includes all boosted decision stumps that depend upon a limited number of different mobile device-specific states, features, behaviors, or conditions. The mobile device may then use this locally generated lean classifier model to quickly classify a mobile device behavior without consuming an excessive amount of its processing, memory, or energy resources.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Stumps are efficient because they are very simple and primal (and thus do not require significant processing resources). Stumps are also very parallelizable, and thus many stumps may be applied in parallel/at the same time (e.g., by multiple cores or processors in the mobile device).

In an aspect, a behavior analyzer module 204 of the mobile device 102 may generate lean classifier models in the form of decision stumps without accessing training data on the network server 116 (e.g., from training data module 306), thereby eliminating the requirement for the feedback communications between mobile device 102 to the network server 116. In other words, the behavior analyzer module 204 may generate and apply lean classifier models without communicating with the cloud or a network to re-train the data, which significantly reduces the mobile device's dependence on the cloud (and thus improves performance and power consumption characteristics of the mobile device). The behavior analyzer module 204 may also use boosted decision stumps to classify computing device behavior to identify malware or malicious behavior.

In an aspect, the mobile device may be configured to perform "joint feature selection and pruning" operations that allow the mobile device to: generate lean classifier models on-the-fly without needing access to cloud training data, dynamically reconfigure the classifiers per application to enhance the classification accuracy, and specify a deterministic complexity for each classifier (e.g., O(# of stumps)).

In an aspect, the "joint feature selection and pruning" operations may include performing feature selection operations. For example, the behavior analyzer module 204 may determine that it needs to generate a lean classifier model that tests 2 unique features (e.g., F1 and F3), in which case the feature selection operations may include traversing a list of 100 boosted decision stumps until the first 2 unique features (e.g., F1 and F3) are discovered.

The behavior analyzer module 204 may then test only the features identified by feature selection operations (e.g., F1 and F3), which may be accomplished by traversing the entire list of 100 boosted decision stumps and deleting any stump that tests a different feature/condition (e.g., F5). The remaining boosted decision stumps (i.e., stumps that tests conditions "F1" and "F3") may be used as a lean classifier model without re-training the data. The behavior analyzer module 204 may apply the behavior information (e.g., in the form of a behavior vector) to each of the remaining boosted decision stumps, compute a weighted average of all the answers received from the remaining stumps, and use the weighted average to determine if a mobile device behavior is malicious or benign.

Once the boosted decision stumps have been generated through the feature selection and pruning process, the behavior analyzer module 204 may use selected decision stumps as a behavior model that the behavior analyzer module 204 may compare against current device states, settings and behaviors. Since decision stumps are binary tests that are independent, the behavior analyzer module 204 may perform the behavior analysis process of comparing observed behaviors, which may be summarized in a behavior vector, to the model in parallel. Also, since the stumps are very simple (basically binary), the processing to perform each stump may be very simple and thus may be accomplished quickly with less processing overhead. Because each decision stump yields an answer with a weight value, the behavior analyzer module 204's ultimate decision regarding whether behaviors are malicious or benign may be determined as the weighted sum of all the results, which may also be a simple calculation.

Thus, in an aspect, the behavior analyzer module 204 may generate a behavior vector from observations of on-going behaviors on the mobile device 102 received from a behavior observer module 202, and the behavior analyzer module 204 may apply the behavior vector to boosted decision stumps to determine whether the on-going behaviors on the mobile device 102 are malicious or benign.

In further aspects, the behavior analyzer module 204 may modify lean classifier models generated as a result of performing the joint feature selection and pruning operations to incorporate features specific to the mobile device 102 and/or specific to the current state/configuration of the mobile device 102. In an aspect, the lean classifier models that the behavior analyzer module 204 generates from the large classifier model received from the network server 116 may not adequately represent the features and current behaviors of the mobile device 102. For example, the large classifier model received from the network server 116 may only include a small number of behavior vectors/models related to near-field communications, so if the behavior analyzer module 204 generated a lean classifier model without regard to the features include on the mobile device, it might omit the few features related to near-field communications. However, given the importance of near-field communications in conducting certain financial transactions (e.g., Google Wallet), it may be highly desirable to include near-field communication features in the lean classifier model in order to detect malicious activity that could have significant financial implications (e.g., sending credit card information to a hacker). As another example, if the mobile device 102 connects to an unsecured wireless access point it may benefit from increased vigilance of Wi-Fi behaviors because of the increased risk of unauthorized access or other malicious activity. The various aspects address these concerns by considering all of the features and functions included on or connected to the mobile device when pruning a global model down to the lean classifier model used to monitor mobile device behaviors and states.

Further, a lean classifier model may become less effective than it could otherwise be in monitoring for malicious behavior if the model includes features no longer relevant to the mobile device 102 due to changes its configuration or states. For example, if a mobile device is placed in "Airplane Mode", cutting off wireless connections, features related to modem activities and message transmissions become irrelevant. As another example, if the WiFi transceiver is disabled, features related to WiFi communication activities become irrelevant.

In an aspect, by modifying or updating the lean classifier models derived from the large classifier model as the mobile device's state and configuration change and evolve, the behavior analyzer module 204 may ensure that important features related to the mobile device and/or the mobile device's current state are included in the lean classifier model while irrelevant features are removed. By including the important features, the behavior analyzer module 204 may detect malicious behavior with a higher confidence because more relevant features of the mobile device are being monitored.

The behavior analyzer module 204 may learn of features to add or remove to the lean classifier model from a state-specific feature generator 314 and/or a device-specific feature generator 316 operating on the mobile device 102. In an aspect, the state-specific feature generator 314 and/or the device-specific feature generator 316 may be implemented separately or as a part of the behavior analyzer module 204.

In an aspect, the state-specific feature generator 314 may be in communication with a state monitoring engine 318. The state monitoring engine 318 may continually monitor for configuration and/or state changes on the mobile device 102. These configuration and/or state changes may relate to various features or components of the mobile device 102. For example, the state monitoring engine 318 may detect when the mobile device 102 connects to a new wireless network, when the mobile device 102's battery level drops below a threshold (e.g., a low-battery state), when the mobile device 102 is roaming, and establishing a Bluetooth® connection with a wireless peripheral device (e.g., a wireless keyboard or gaming controller). In another aspect, the state monitoring engine may only monitor for significant changes/events on the mobile device 102 (e.g., enabling "Airplane Mode" on the mobile device 102).

After detecting a configuration and/or state change, the state monitoring engine 318 may notify the state-specific feature generator 314. The state-specific feature generator 314 may identity one or more features related to the configuration and/or state change and may send a signal to the behavior analyzer module 204 to add or remove these features from the lean classifier model. For example, when the state-monitoring engine 318 informs the state-specific feature generator 314 that the mobile device 102 has entered "Airplane Mode" (i.e., has turned off its wireless communication capabilities), the state-specific feature generator 314 may determine that features related to the mobile device's Wi-Fi are not currently needed in the lean classifier model.

Based on the feedback received from the state-specific feature generator 314, the behavior analyzer module 204 may modify the lean classifier model to add or remove features, thereby enhancing the behavior analyzer module 204's overall ability to detect malicious behavior and ensuring that only features relevant to the mobile device are monitored.

In another aspect, the device-specific feature generator 316 may be in communication with a device feature monitoring engine 320 configured to monitor for changes in the mobile device's functionality/capabilities. In other words, the device feature monitoring engine 320 may detect when the mobile device 102 adds or removes a particular function, such as a keyboard, mouse, or another peripheral device.

In response to detecting a new or removed capability, the device feature monitoring engine 320 may alert the device-specific feature generator 314 of the change in the mobile device 102's functionality. The device-specific feature generator 314 may determine the features that are associated with the change in functionality and may signal the behavior analyzer unit 204 to add or remove the features associated with the change.

In another aspect, the device-specific feature generator 314 may determine features in the lean classifier model that are not relevant or determine features missing from the lean classifier model that are relevant to the mobile device 102. For example, the behavior analyzer module 204's initial lean classifier model may not include features related the behaviors of a Bluetooth® radio, which may leave the mobile device vulnerable to malicious behavior on its Bluetooth® radio because activity on the Bluetooth® is not in the lean classifier model and thus ignored/not monitored. In such an example, the behavior analyzer module 204 may locate Bluetooth® features in the large classifier model received from the server and may add those Bluetooth® features to the lean classifier model from, thereby ensuring that the mobile device's Bluetooth® radio may be adequately monitored for malicious behavior. Thus, the device-specific feature generator 314 may determine the missing or superfluous features in the lean classifier model and send feedback to the behavior analyzer module 204 to add or remove those features.

Figure 4:
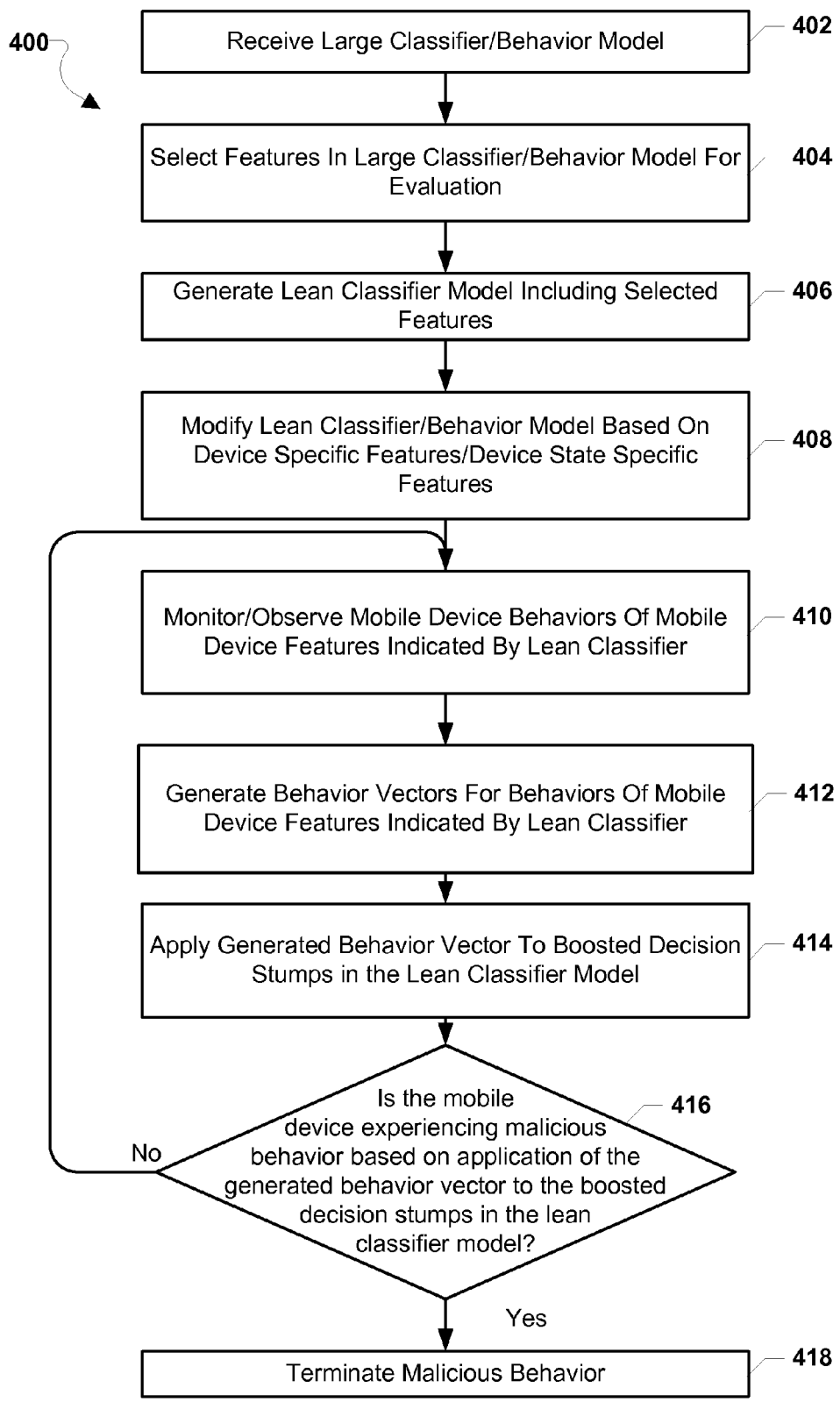
FIG. 4 is a process flow diagram illustrating an aspect method of generating lean classifier models in a mobile device to include a subset of the features and data points that are included in a full classifier model received from a network server.

FIG. 4 illustrates an aspect method 400 of generating a lean classifier that takes into account device-specific and device-state specific features of a mobile device. Method 400 may be performed by a processing core in a mobile device.

In an aspect, the method 400 may include receiving in a processor of the mobile device a full classifier model that identifies a plurality of test conditions (e.g., a finite state machine that includes information that is suitable for conversion a plurality of decision nodes that each evaluate one of the plurality of test conditions, etc.), using device-specific information of the mobile device to identify mobile device-specific test conditions in the plurality of test conditions that are relevant to classifying a behavior of the mobile device, generating in the mobile device a lean classifier model that includes only the identified mobile device-specific test conditions (e.g., includes only the decision nodes that evaluate a mobile device feature that is relevant to a current operating state or configuration of the mobile device, etc.), and using the generated lean classifier model in the mobile device to classify the behavior of the mobile device.

Returning to FIG. 4, in block 402, the processing core may receive a full classifier model that includes or identifies a large number of features and/or a plurality of test conditions associated with the features. In an aspect, the full classifier model may include a plurality of boosted decision trees or stumps that are suitable for use by the mobile device in classifying a behavior as benign or malicious, such as by applying behavior vector values as inputs to the boosted decision stumps/trees to test a conditions relating to a feature of the mobile device.

Applying behavior vector values to a large number of stumps/trees to test multiple features in large classifier model may be taxing on the mobile device 102. For example, these operations may occupy the processor and memory functions to the detriment of the performance of other processes of the mobile device. These operations may also deplete the battery power of the mobile device 102. To help reduce these diminishing affects on the mobile device 102's performance, the mobile device 102 may implement a joint feature selection and pruning algorithm to generate a lean classifier model from the large classifier model.

In block 404, the behavior analyzer module 204 operating in the processing core may select features from the large classifier model to monitor and to evaluate in order to classify related mobile device behaviors. Various criteria may be used to select the features and boosted decision stumps from the large classifier model. For example, a rule of the joint feature selection and pruning algorithm may specify selecting features considered vital to the proper operation of the mobile device 102, like processor, memory, and communication features. The rule may also specify a first number of features (e.g. the first 50, 100, 200, 1,000, etc.) that may be appropriate when the large classifier model is ordered in a manner from most to least vital or common mobile device features.

In block 406, the behavior analyzer module 204 operating in the processing core may generate the lean classifier model from the selected features to test the behavior of at least one feature of the mobile device 102. In an aspect, the behavior analyzer module 204 may scan through the list of boosted decision stumps included in the large classifier module and incorporate into the lean classifier model every boosted decision stump that tests or is answered by at least one of the selected features. Thus, in an aspect, the lean classifier model may include both the selected features and the boosted decision stumps associated with those selected features.

In block 408, the behavior analyzer module 204 operating in the processing core may modify the lean classifier model based on device-specific features/functionality and/or device-state-specific features. Because the network server 116 creates the large classifier model using information from various types of mobile devices, the lean classifier model— which is derived from the large classifier model—may include numerous features that are unrelated to the mobile device (i.e., features related to other types of mobile devices) or may not include some critically important features (i.e., features not selected in the large classifier model). Because of the presence of irrelevant features or lack of important features, the lean classifier model may either waste resources (e.g., battery power, CPU cycles, etc.) monitoring irrelevant features in the former case or provide ineffective security by not monitoring crucial features in the latter case. Thus, the overall security and performance of the mobile device may benefit from modifying the lean classifier model to more closely reflect the mobile device's features and features related to the mobile device's current state. The process of modifying the lean classifier model is further described below with reference to FIGS. 5-8.

In an aspect, the behavior analyzer module 204 operating in the processing core may modify the lean classifier model to reflect changes in the specific features and states of the mobile device 102 without needing to contact the network server 116 by incorporating unselected features, identified by the mobile device 102, and having related boosted decision stumps incorporated from the received large classifier model. The lean classifier model may also be modified by removing unnecessary features and boosted decision stumps from the lean classifier model based on device-specific and device-state specific information. Obviating the need to contact the network server 116 to re-train the information produced from the changes to the mobile device may save power, processing, and communication resources of the mobile device. Removing unnecessary features and boosted decision stumps may also save power and processing resources by avoiding processing of excess or irrelevant information.

In block 410 the behavior observer 202 operating in the processing core may monitor/observe the behavior of the mobile device features indicated by the lean classifier model. The behavior observer 202 may record data related to the features as described above with reference to FIG. 2.

In block 412 the behavior analyzer module 204 may generate behavior vectors for behaviors of the mobile device features included in the lean classifier model. In an aspect, the behavior vectors may utilize observations received from the behavior observer 202 to generate the behavior vectors as described above with reference to FIG. 2.

In block 414 the classifier 208 and/or the behavior analyzer module 204 operating in the processing core may apply the generated behavior vectors to the boosted decision stumps. In an aspect, the classifier 208 and/or the behavior analyzer module 204 may apply values in the behavior vector representing a particular feature to one or more booster decision stump that tests that particular feature. The results of applying the behavior vector values to the boosted decision stump is a binary outcome, such as "yes" or "no," with each outcome assigned a weighted probability indicating a confidence factor that the behavior of the feature is benign or malicious. For example, the behavior classifier 208 may test a short message service (SMS) feature on the mobile device 102 by using its behavior vector value for SMS (e.g., a value representing the number of SMS messages sent in the last ten minutes) to resolve boosted decision stumps related to the SMS feature. The boosted decision stumps associated with the SMS feature may include the tests of whether "150 or fewer SMS messages sent in the last ten minutes," "100 or fewer SMS messages sent in the last ten minutes," "50 or fewer SMS messages sent in the last ten minutes," etc. Each resolution for a boosted decision stump test may produce a certain weighted probability that the behavior of the SMS feature of the mobile device 102 is malicious or benign, and the behavior classifier 208 may combine the weighted probabilities to determine whether the current configuration of the mobile device 102 is malicious or benign and a certain confidence of that conclusion (e.g., the current configuration is benign with a 35% confidence).

In determination block 416, the classifier module 208 and/or the behavior analyzer module 204 may determine whether the mobile device is experiencing malicious behavior based on the results of applying the generated behavior vector to the boosted decision stumps in the lean classifier model.

When the classifier module 208 determines that the mobile device is experiencing malicious behavior (i.e., determination block 416="Yes"), the actuator 210 may terminate the malicious behavior in block 418. To terminate the malicious behavior the actuator may restrict access to the related feature of the offending behavior, or identify the element responsible for the behavior and quarantine or delete the element. When the classifier 208 determines that the mobile device is not experiencing malicious behavior (i.e. determination block 416="No"), the process may continue in a loop as the behavior observer 202 may continue by monitoring/observing the behavior of the mobile device features indicated by the lean classifier model in block 410.

Generally, mobile devices share a variety of common elements/features; however, for certain elements/features there is broad disparity between mobile devices. Features like near field communication may be offered by manufacturers in mobile devices at or near the top of their product ranges. Purpose-built devices developed for government or business use may include features such as secure communication or biometric user identification capabilities. These features may be device-specific features that are not commonly included in other mobile devices.

Similarly, peripheral devices and software may extend the features of a mobile device beyond its original feature set. For example, a Bluetooth® enabled earpiece or keyboard, a magnetic strip reader connected via an audio jack, a connected medical device (e.g. a pacemaker), or an HDMI connected external display (e.g. a television, a monitor, or a projector) are peripheral devices now in common use that extend the feature set of a mobile device when they are connected. All these features may be device-specific features that are highly dependent and specific to the particular mobile device in which they are implemented, included, monitored and/or evaluated.

Figure 5:
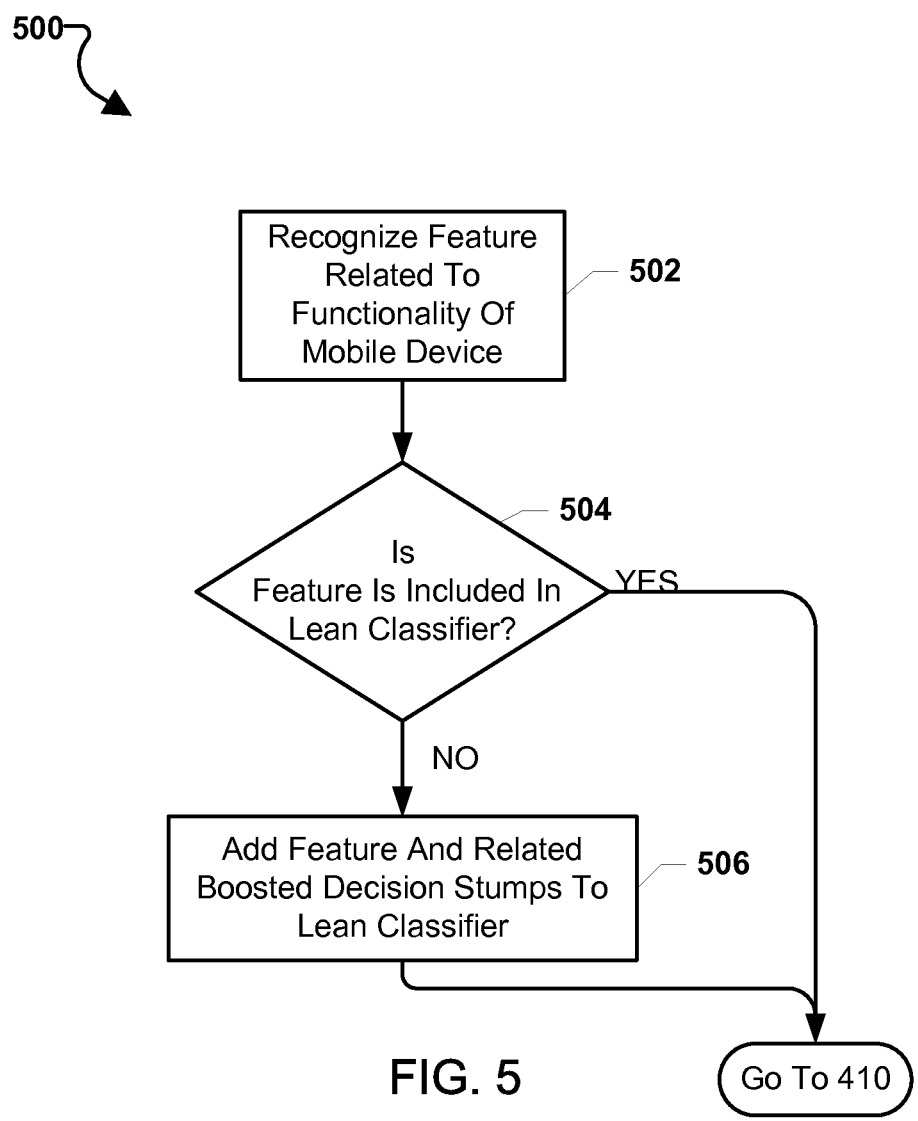
FIG. 5 is a process flow diagram illustrating a method of generating or modifying a lean classifier model in a mobile device by selecting and adding device specific features of the mobile device to the lean classifier model in accordance with various aspects.

FIG. 5 illustrates an aspect method 500 of modifying a classifier model to include device-specific features of the mobile device in which the model is used. Method 500 may be performed in a processing core of a mobile device 102.

In block 502 the device feature monitor engine 320 operating in the processing core may recognize a feature related to a functionality of the mobile device. Recognizing the feature may occur upon initialization of the mobile device or malicious behavior monitoring application and/or upon initialization of the feature. For example, the device feature monitor engine 320 may determine at the startup of the mobile device to identify the functionalities/capabilities of the mobile device, such as Bluetooth®, one or more WAN radios, input/output devices (e.g., cameras, speakers, a mouse, a keyboard, etc.). In another example, the device feature monitor engine 320 may recognize other functionalities/capabilities related to peripheral devices in communication with or controlled by the mobile device, such as a remote processing device.

In determination block 504, the device specific feature generator 316 operating in the processing core may determine whether the recognized feature is included among the features selected from the large classifier model for inclusion in the lean classifier model. In an aspect, the device-specific feature generator 316 may receive a notification from the device feature monitor engine 320 of the functionality/capabilities currently present on the mobile device. For example, the device-specific feature generator 316 may recognize that the mobile device includes a Bluetooth® radio and may alert the device-specific feature generator 316 of this capability. In response, the device-specific feature generator 316 may determine whether a feature related to the Bluetooth® radio is or should be included in the lean classifier model.

When the device specific feature generator 316 determines that the recognized feature is one of the features included in the lean classifier model (i.e. determination block 504="Yes"), the processing core may determine that no change to the lean classifier model is to be made and the behavior observer module 202 operating in the processing core may continue to monitor/observe the behavior of the mobile device by collecting information on the features indicated by the lean classifier model in block 410. In other words, the device-specific feature generator 316 may determine that no further action is required because the lean classifier model already includes the recognized feature.

When the device specific feature generator 316 determines that the recognized feature is not one of the features included in the lean classifier model (i.e. determination block="No"), in block 506 the behavior analyzer module 204 may add to the lean classifier model the feature identified by the device specific feature generator 316, along with the related corresponding boosted decision stumps from the large classifier model. In an aspect, the behavior analyzer module 204 may add the recognized feature in order to ensure that the lean classifier model sufficiently represents the capabilities and functionality of the mobile device (i.e., to ensure that the mobile device's device-specific features/functionality are adequately monitored/protected).

The behavior observer 202 may then continue to monitor/observe the behavior of the mobile device features indicated by the updated lean classifier model in block 410.

Adding features to the lean classifier may help to keep the lean classifier current with changes in the configuration and operating state of a mobile device. As mentioned above, having an up-to-date lean classifier may improve the ability of the behavior analyzer module 204 to monitor for malicious behavior on the mobile device 102 because a more complete set of the active features may be monitored. In an aspect, some features, when active, become increasingly important to monitor because they may provide access to sensitive information, such as financial information. For example, near-field communication is closely related to electronic commerce. This feature often has access to credit card information and electronic commerce accounts information, such a Google Wallet and PayPal account information. Thus, adding active features with access to sensitive information may be important to protect this information from malicious behaviors.

Figure 6:
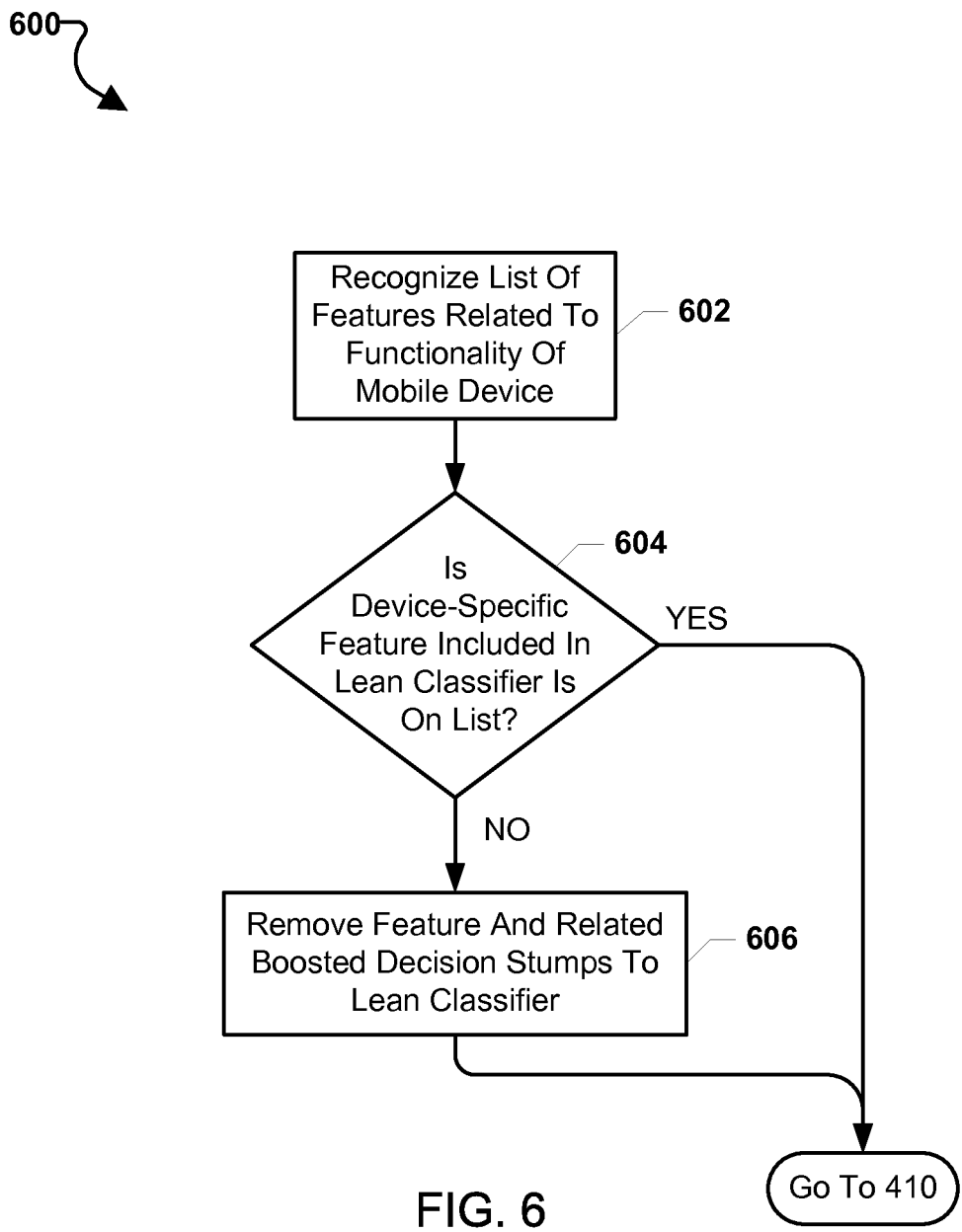
FIG. 6 is a process flow diagram illustrating a method of generating or modifying a lean classifier in a mobile device by removing device specific features of the mobile device from a full classifier model in accordance with various aspects.

FIG. 6 illustrates an aspect method 600 that may be implemented on a mobile device for modifying the lean classifier model by removing device-specific features of the mobile device. When a feature of the mobile device 102 changes (e.g., a peripheral device is removed from the mobile device), the feature may no longer be included on the mobile device 102 but may remain addressed in the lean classifier model. This adds unnecessary complexity to the processing of the behavior vectors because it now may include information that is not useful or relevant to monitoring behaviors of the mobile device because the nonexistent features cannot be malicious. One leftover feature may not have much of an impact on the resources and capabilities of the mobile device 102. But, over time the number of removed features may increase and cause noticeable deterioration in the behavior monitoring processes. Thus, it may beneficial to remove features and corresponding boosted decision stumps from the lean classifier model when they are no longer relevant to the mobile device's current configuration or operating state.

In block 602 the device feature monitor engine 320 may recognize a list of features related to the functionality of the mobile device 102. The list may contain each feature related to the functionality of the mobile device, such as its near-field communication capabilities, peripheral devices, WAN radios, etc.

In determination block 604 the device specific feature generator 316 may determine whether features related to device-specific capabilities included in the lean classifier model are included in the list of features related to the functionality of the mobile device. In other words, the specific feature generator 316 may determine whether any features (e.g., Bluetooth®, near-field communications, or other device-specific functions) in the lean classifier model are superfluous because those features or related functionality are not present on the mobile device. When the device specific feature generator 316 determines that all of the features in the lean classifier model are on the list (i.e. determination block 604="Yes"), no change to the lean classifier model may be made and the behavior observer 202 may continue to monitor/observe the behavior of the mobile device features indicated by the lean classifier model in block 410.

When the device specific feature generator 316 determines that one or more features related to mobile device capabilities/functionality in the lean classifier model is not on the list of mobile device capabilities/functionality (i.e. determination block 604="No"), the behavior analyzer module 204 may remove the irrelevant or superfluous feature(s) and corresponding booster decision stumps from the lean classifier model in block 606. For example, the behavior analyzer module 204 may remove from the lean classifier model features related to a Bluetooth® radio when the Bluetooth® radio is deactivated on the mobile device. The behavior observer 202 may then continue to monitor/observe the behavior of the mobile device features using the updated lean classifier model in block 410.

Figure 7:
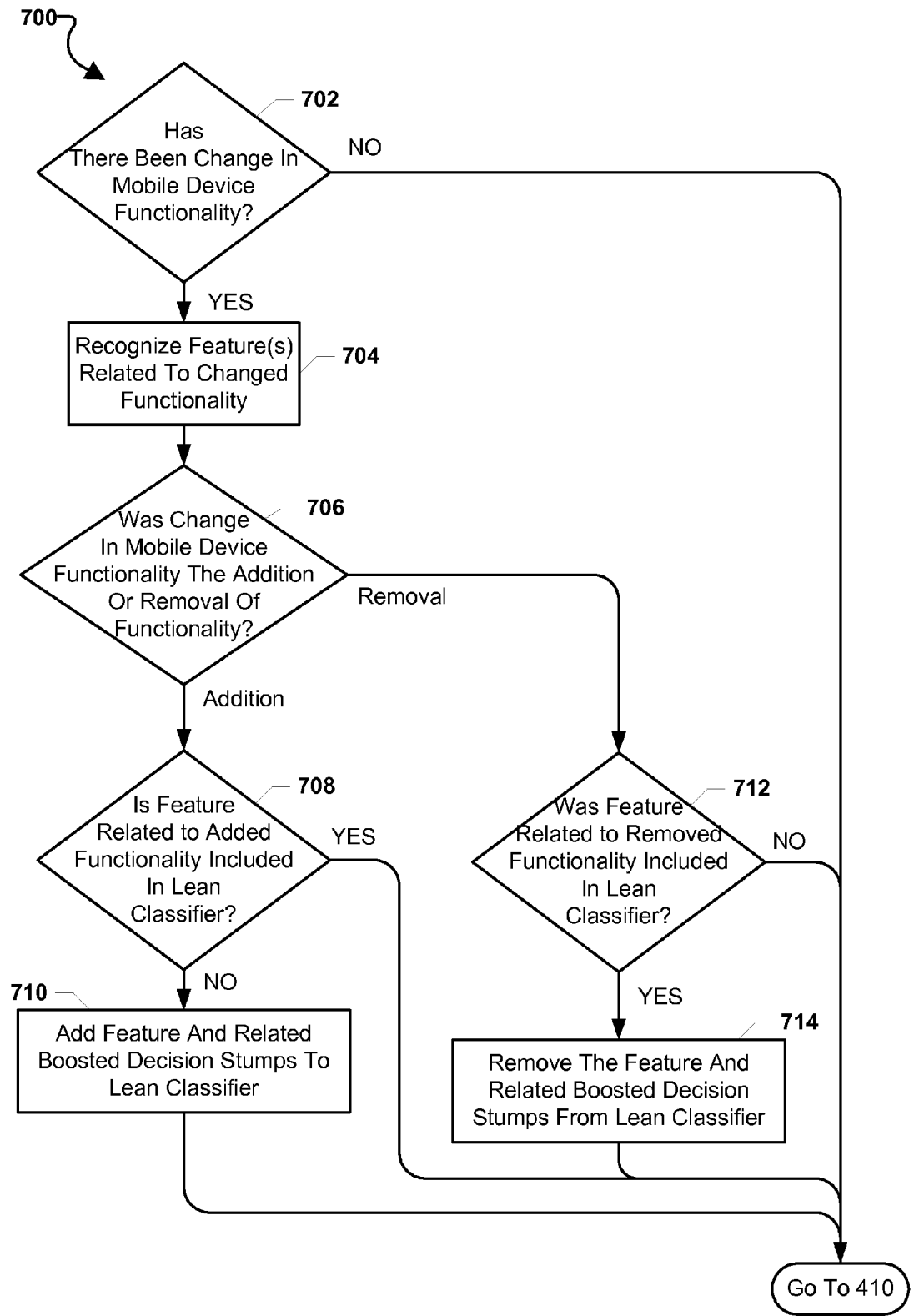
FIG. 7 is a process flow diagram illustrating another method of generating or modifying a lean classifier model in a mobile device by adding device specific and device-state specific features of the mobile device to the classifier model in accordance with various aspects.

FIG. 7 illustrates an aspect method 700 that may be implemented on a mobile device for modifying the lean classifier model to account for changes in device specific features of the mobile device. Method 700 may be performed in a processing core of a mobile device. In aspects in which the features of the mobile device 102 are static, it may be sufficient for the processing core to check the features of the mobile device 102 once, for example, the first time the complete mobile device 102 is powered on. In other aspects in which the features may be sporadically changed, checking the features of the mobile device 102 may occur, for example, when the mobile device 102 runs an update procedure or the software for monitoring the behaviors of the mobile device 102 is initialized. However, aspects in which the features of the mobile device 102 are dynamic (i.e., in which functionality and/or features can be added and removed during normal operation of the mobile device 102), it may be advantageous to identify the changes and adapt the lean classifier model to the features as they occur. Connecting and disconnecting peripheral devices, similar to the peripheral devices previously mentioned, may incite these changes in the device functionality and/or features.

In determination block 702 the device feature monitor engine 320 operating in a processing core of the mobile device may monitor the mobile device to determine whether there are or have been any changes in a state, configuration, capability, or functionality of the mobile device. In an aspect, the feature monitor engine 320 may be configured to constantly monitor the mobile device 102 to determine when a functionality related to a device-specific feature of the mobile device has been added or removed. In another aspect, the device feature monitor engine 320 may be configured to receive prompts that notify the device specific feature generator 320 when a functionality and/or feature is added or removed. For example, the device-specific feature generator 320 may be notified when an interrupt is received in the kernel space to connect or disconnect a peripheral device from the mobile device 102.

When the device feature monitor engine 320 determines there is has been no change to the functionality of the mobile device 102 (i.e. determination block 702="No"), no change to the lean classifier model may be made and the behavior observer 202 may continue to monitor/observe the behavior of the mobile device features indicated by the lean classifier model in block 410. When the device feature monitor engine 320 determines that there is or has been a change to the functionality of the mobile device 102 (i.e. determination block 702="Yes"), in block 704 the device specific feature generator 316 may recognize or identify an mobile device feature associated with the detected change in the functionality. Multiple features may share or be related to a given functionality. In an aspect, the device specific feature generator 316 may receive an indication of the functionality that has changed from the device feature monitor engine 320. The device specific feature generator 316 may correlate the functionality with one or more features and identify which of the features is affected by the change in functionality. For example, different peripheral devices connected to the mobile device 102 may stream media over a wireless connection, like Bluetooth®, from the mobile device 102. One such peripheral device may be a set of wireless speakers while the other may be a wirelessly connected television. Both peripheral devices may functionally allow for streaming media; however the device specific feature generator 316 may distinguish that the speakers may provide the feature to stream audio media and the television may provide the features to stream audio media, video media, and audio/video multimedia. Thus, a change in only the functionality of streaming audio may lead the device specific feature generator 316 to conclude that the feature affect by the change is the audio streaming to the wireless speakers and not to the wireless television.

In determination block 706 the device specific feature generator 316 may determine whether the change in the functionality of the mobile device was the addition or removal of functionality. That is, in determination block 706, the processing core may determine whether the detected change in functionality represents added or removed functionality. This determination may aid in maintaining a current lean classifier model. As previously discussed, maintaining the lean classifier model may improve the performance of the monitoring for malicious behavior and reduce the monitoring impact on the performance of the mobile device 102.

When the device specific feature generator 316 determines that the change was an addition of functionality (i.e. determination block 706="Addition"), in determination block 708 the device specific feature generator 316 may determine whether the recognized feature associated with changed functionality is included in the lean classifier model. For example, the processing core may determine whether the lean classifier model includes any test conditions that evaluate a mobile device feature affected by the detected change in functionality in response to determining that the detected change in functionality represents added functionality in determination block 708. When the device specific feature generator 316 determines that the recognized feature is included in the features of the lean classifier model (i.e. determination block 708="Yes"), the processing core may determine that no changes are to be made to the lean classifier model, and the behavior observer 202 may continue to monitor/observe the behavior of the mobile device features indicated by the lean classifier model in block 410.

When the device specific feature generator 316 determines that the recognized feature of the mobile device is not included in the lean classifier model (i.e. determination block 708="No"), in block 710 the behavior analyzer module 204 may add the feature identified by the device specific feature generator 316, and its related boosted decision stumps, from the large classifier model to the lean classifier model. That is, in block 710, the processing core may determine whether the full classifier model includes any test conditions that evaluate the mobile device feature in response to determining that the lean classifier model does not include any test conditions that evaluate the mobile device feature, and add a test condition that evaluates the mobile device feature affected by the detected change to the lean classifier model in response to determining that the full classifier model includes test conditions that evaluate the mobile device feature. Adding new features to the lean classifier when new functionality is added to the mobile device enables effective malicious behavior monitoring of all features and functionality of the mobile device 102 as its configuration changes. The behavior observer 202 may continue to monitor/observe the behavior of the mobile device features indicated by the updated lean classifier model in block 410.

When the device specific feature generator 316 determines that the change involved the removal of functionality and/or feature(s) (i.e. determination block 708="Removal"), in determination block 712 the device specific feature generator 316 may determine whether the recognized feature is included in the lean classifier model. When the device specific feature generator 316 determines that the feature(s) is/are in the lean classifier model (i.e. determination block 712="Yes"), in block 714 the behavior analyzer module 204 may remove that feature(s) and the related booster decision stumps from the lean classifier model. Removing features and booster decision stumps that are no longer relevant to the mobile device 102 may reduce the resources needed to monitor for malicious behaviors, thus reducing the impact on the performance of the mobile device 102. The behavior observer 202 may continue to monitor/observe the behavior of the mobile device features indicated by the lean classifier model in block 410. When the device specific feature generator 316 determines that the recognized feature(s) is not in the lean classifier model (i.e. determination block 714="No"), no change to the lean classifier model may be made and the behavior observer 202 may continue to monitor/observe the behavior of the mobile device features indicated by the lean classifier model in block 410.

Figure 8:
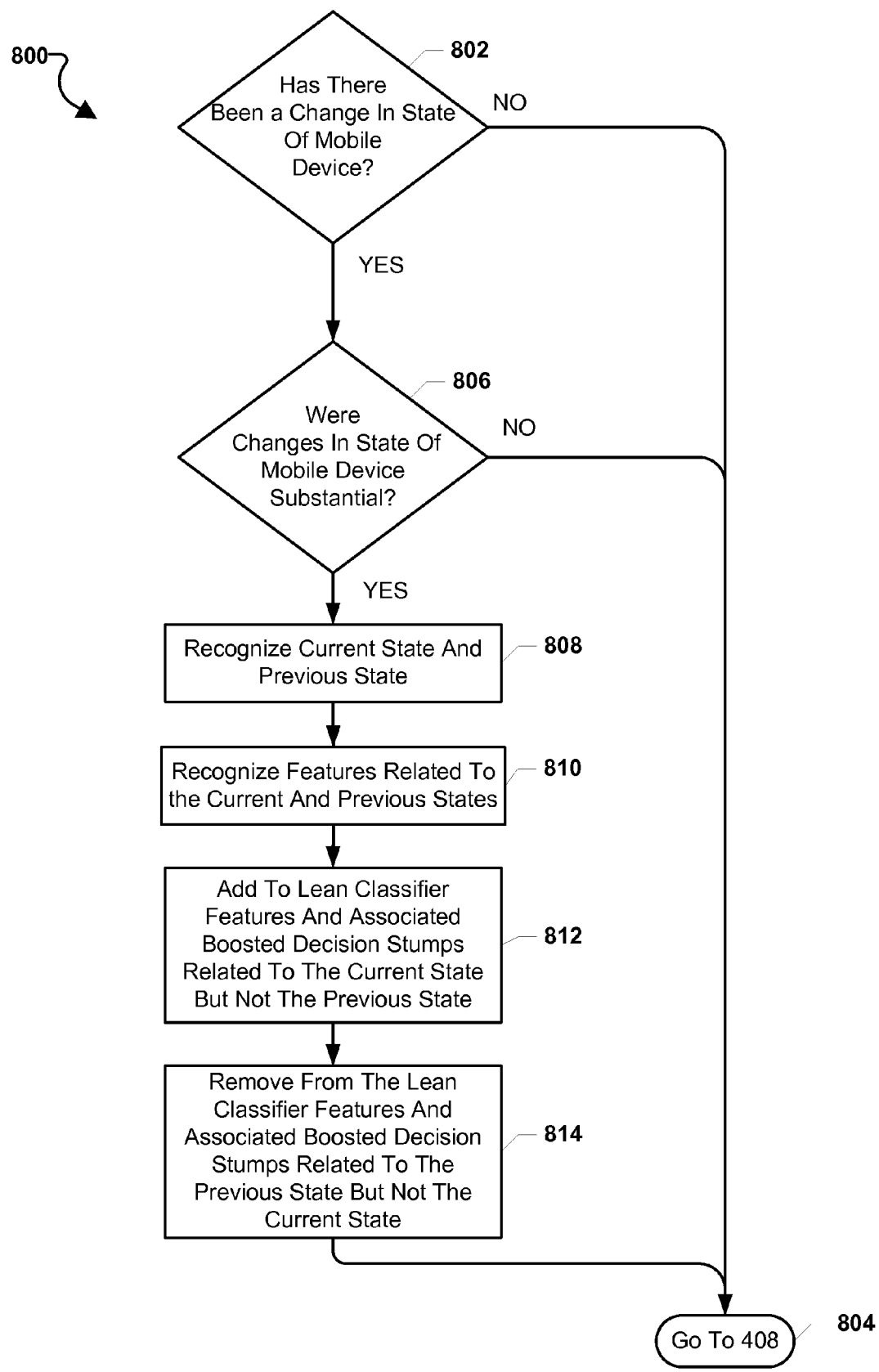
FIG. 8 is a process flow diagram illustrating another method for generating or modifying a lean classifier model in the mobile device by adding device-state specific features of the mobile device to the classifier model in accordance with various aspects.

FIG. 8 illustrates an aspect method 800 for modifying the lean classifier model by adding features of the mobile device related to states of the mobile device. The state of a mobile device may be constantly changing, and every event occurring on the mobile device 102 may change a state related to a feature. States may change, for example, when the mobile device 102 becomes active or idle, makes a communication connection or ends a connection, and is plugged into a charger or unplugged so that it is running on the battery. States may change so frequently that identifying features at every state change could be onerous, as would having to get feature information from the network server 116 or even the received large classifier model. States may also change very quickly, and if features were updated for every state change, by the time the update occurred the update may be obsolete because the related state changed again. Thus, the mobile device 102 may require that a state change be substantial before identifying a function to add to or remove from the lean classifier model. A substantial state change may include disconnecting all wireless connection, like when activating ""Airplane Mode","" reducing security protocol levels when connected to a secure network access point, or entering and exiting a roaming mode for cellular communication.

In determination block 802 the state monitoring engine 318 may determine whether there has been a change in state on the mobile device. The state monitoring engine 318 may monitor all or a subset of the states of the mobile device. In an aspect, some states of the mobile device may not be considered as indicative of a feature that may contribute to or be involved in malicious behavior and, therefore, do not need to be monitored. In a further aspect, the states that are monitored by the state monitoring engine 318 may be constantly monitored for the changes in state. When the state monitoring engine 318 determines that there has been no change in state (i.e. determination block 802="No"), no change to the lean classifier model may be made and the behavior observer 202 may continue to monitor/observe the behavior of the mobile device features indicated by the lean classifier model in block 410.

As discussed above, not all state changes may be considered important, and many happen so quickly and/or often that it may not be effective to monitor (or stop monitoring) the related features based on the changes in state. When the state monitoring engine 318 determines that there is a change in state (i.e. determination block 802="Yes"), in determination block 806 the state monitoring engine 318 may determine whether the change or changes in state of the mobile device were substantial. When the state monitoring engine 318 determines the change/changes in state of the mobile device was/were not substantial (i.e. determination block 806="No"), the behavior observer 202 may continue to monitor/observe the behavior of the mobile device features indicated by the lean classifier model in block 410. When the state monitoring engine 318 determines that the change/changes in state of the mobile device was/were substantial (i.e. determination block 806="Yes"), in block 808 the state monitoring engine 318 may recognize a current state and a previous state of the mobile device. In an aspect, what makes a state change substantial may be predetermined and substantial state changes may be identified by rules accessed by the state monitoring engine 318.

In block 810 the state specific feature generator 314 may recognize features related to the current and previous states. In an aspect, the state specific feature generator 314 may received a notification of a substantial state change from the state monitoring engine 318 which may trigger the state specific feature generator 314 to correlate or recognize a feature with the substantial state change. In an aspect, the correlations between features and substantial state changes may be direct correlations. For example, a state of a wireless connection being established over WiFi may be directly related to a WiFi feature of the mobile device 102. In another aspect, the correlations between the features and the substantial state changes may be tangential correlations. For example, a state indicating a fast network connection may indicate better interaction with a cloud server, which may be involved with malicious behavior on the mobile device 102, such as offloading information to the cloud serve. In another aspect, the correlations may be indirect correlations. For example, a battery state of the mobile device 102 may be correlated to various sets of features. During a high battery state a broad set of features, including high and low priority features, may be monitored for malicious behaviors when the mobile device 102 has sufficient power resources to handle monitoring the broad set of features. Similarly, during a low battery state a narrow set of features, including high priority features, may be may be monitored for malicious behaviors when the mobile device 102 does not have sufficient power resources to handle monitoring the broad set of features.

In block 812 the behavior analyzer module 204 may add to the lean classifier model any features, along with the, identified by the state specific feature generator 314 related to the current state but not related to the previous state (i.e., newly relevant features). The features and associated boosted decision stumps added to the lean classifier model may be obtained from the large classifier model. In block 814 the behavior analyzer module 204 may remove any features and the associated boosted decision stumps from the lean classifier model that are recognized as related to the previous state but not related to the current state (i.e., no longer relevant). The behavior observer 202 may continue to monitor/observe the behavior of the mobile device features indicated by the lean classifier model in block 410. Adding and removing the features and boosted decision stumps related to the substantial state changes in this manner may keep the lean classifier current as discussed above.

Figure 9:
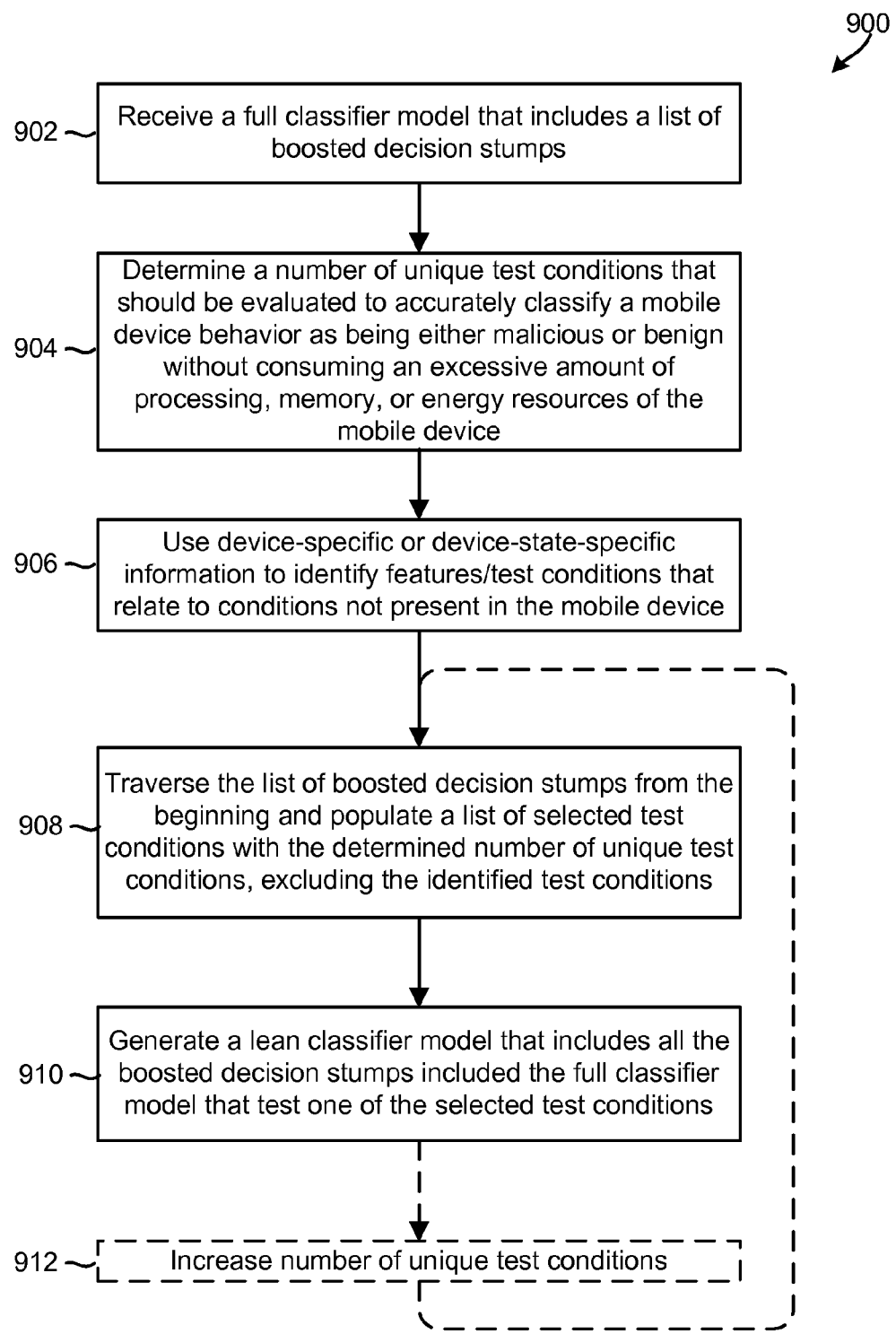
FIG. 9 is a process flow diagram illustrating another method for generating or modifying a lean classifier model in the mobile device by adding device-state specific features of the mobile device to the classifier model in accordance with various aspects.

FIG. 9 illustrates an aspect method 900 of generating a lean or focused classifier/behavior models that account for device-specific and device-state specific features of a mobile device. Method 900 may be performed by a processing core in a mobile device.

In block 902 of method 900, the processing core may receive a full classifier model that is or includes a finite state machine, a list of boosted decision trees, stumps or other similar information structure that identifies a plurality of test conditions. In an aspect, the full classifier model includes a finite state machine that includes information suitable for expressing plurality of boosted decision stumps and/or which include information that is suitable for conversion by the mobile device into a plurality of boosted decision stumps. In an aspect, the finite state machine may be (or may include) an ordered or prioritized list of boosted decision stumps. Each of the boosted decision stumps may include a test condition and a weight value.

As discussed above, boosted decision stumps are one level decision trees that have exactly one node (and thus one test question or test condition) and a weight value, and thus are well suited for use in a binary classification of data/behaviors. This means that applying a feature vector or behavior vector to boosted decision stump results in a binary answer (e.g., Yes or No). For example, if the question/condition tested by a boosted decision stump is "is the frequency of SMS transmissions less than x per min," applying a value of "3" to the boosted decision stump will result in either a "yes" answer (for "less than 3" SMS transmissions) or a "no" answer (for "3 or more" SMS transmissions).

Returning to FIG. 9, in block 904 of method 900, the processing core may determine the number unique test conditions that should be evaluated to accurately classify a mobile device behavior as being either malicious or benign without consuming an excessive amount of processing, memory, or energy resources of the mobile device. This may include determining an amount of processing, memory, and/or energy resources available in the mobile device, the amount processing, memory, or energy resources of the mobile device that are required to test a condition, determining a priority and/or a complexity associated with a behavior or condition that is to be analyzed or evaluated in the mobile device by testing the condition, and selecting/determining the number of unique test conditions so as to strike a balance or tradeoff between the consumption of available processing, memory, or energy resources of the mobile device, the accuracy of the behavior classification that is to be achieved from testing the condition, and the importance or priority of the behavior that is tested by the condition.

In block 906, the processing core may use device-specific or device-state-specific information to quickly identify the features and/or test conditions that should be included or excluded from the lean classifier models. For example, the processing core may identify the test conditions that test conditions, features, or factors that cannot be present in the mobile device due to the mobile device's current hardware or software configuration, operating state, etc. As another example, the processing core may identify and exclude from the lean classifier models the features/nodes/stumps that are included in the full model and test conditions that cannot exist in the mobile device and/or which are not relevant to the mobile device.

In an aspect, in block 908, the processing core may traverse the list of boosted decision stumps from the beginning to populate a list of selected test conditions with the determined number of unique test conditions and to exclude the test conditions identified in block 906. For example, the processing core may skip, ignore, or delete features included in the full classifier model that test conditions that cannot be present in the mobile device due to the mobile device's current hardware or software configuration. In an aspect, the processing core may also determine an absolute or relative priority value for each of the selected test conditions, and store the absolute or relative priorities value in association with their corresponding test conditions in the list of selected test conditions.

In an aspect, in block 908, the processing core may generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions. In a further aspect, generating the list of test conditions may include sequentially traversing the decision nodes of the full classifier model, ignoring decision nodes associated with test conditions not relevant to classifying the behavior of the mobile device, and inserting test conditions associated with each sequentially traversed decision node that is not ignored into the list of test conditions until the list of test conditions includes the determined number of unique test conditions.

In block 910, the processing core may generate a lean classifier model that includes all the boosted decision stumps included in the full classifier model that test one of the selected test conditions (and thus exclude the test conditions identified in block 906) identified in the generated list of test conditions. In an aspect, the processing core may generate the lean classifier model to include or express the boosted decision stumps in order of their importance or priority value.

In optional block 912, the number of unique test conditions may be increased in order to generate another more robust (i.e., less lean) lean classifier model by repeating the operations of traversing the list of boosted decision stumps for a larger number test conditions in block 908 and generating another lean classifier model in block 910. These operations may be repeated to generate a family of lean classifier models.

Figure 10:
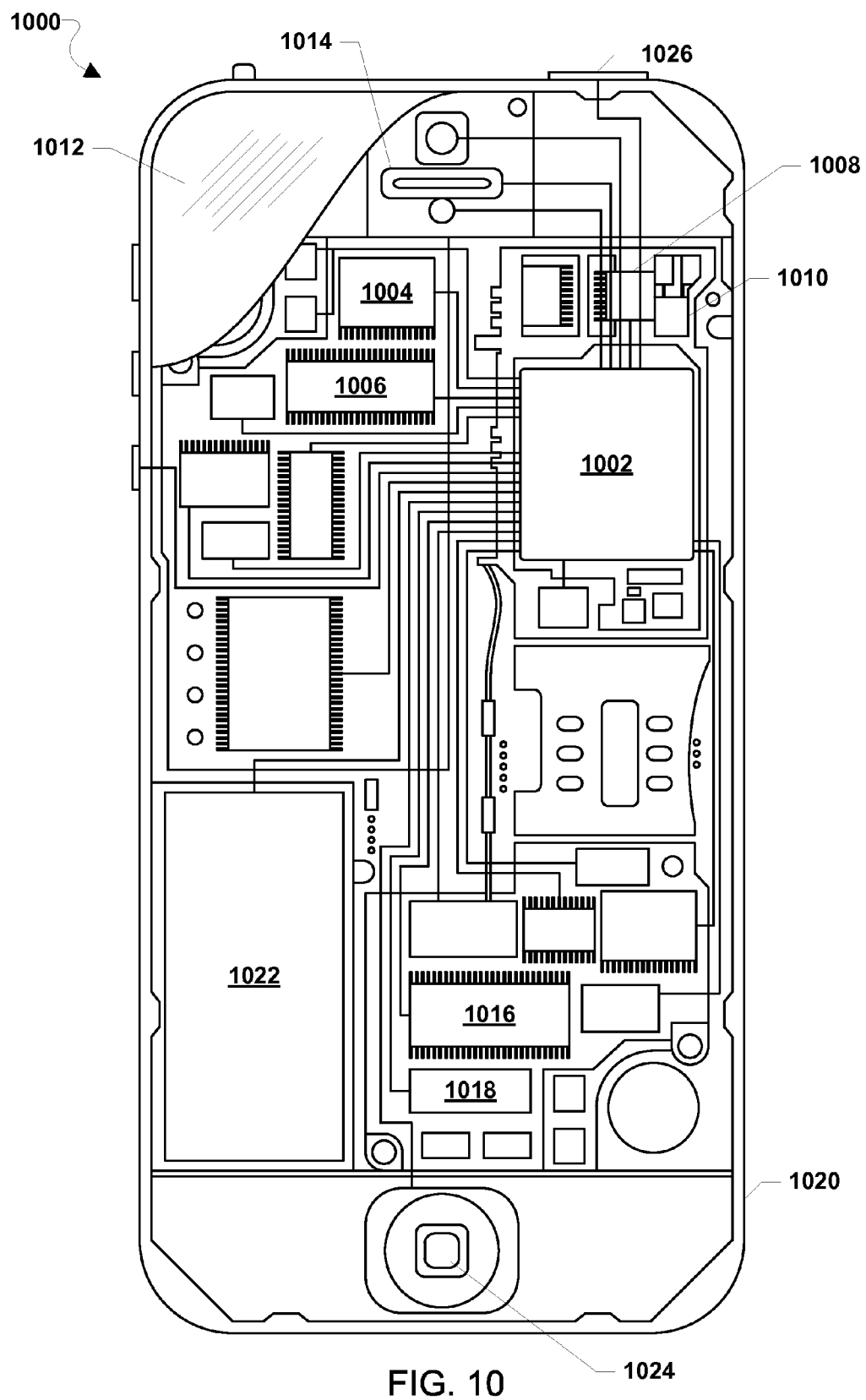
FIG. 10 is a component block diagram of a mobile device suitable for use in an aspect.

The various aspects may be implemented in any of a variety of mobile computing devices, an example of which is illustrated in FIG. 10. The mobile computing device 1000 may include a processor 1002 coupled to a touchscreen controller 1004 and an internal memory 1006. The processor 1002 may be one or more multicore integrated circuits designated for general or specific processing tasks. The internal memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the mobile computing device 1000 need not have touch screen capability.

The mobile computing device 1000 may have one or more radio signal transceivers 1008 (e.g., Peanut, Bluetooth®, Zigbee, Wi-Fi, RF radio) and antennae 1010, for sending and receiving communications, coupled to each other and/or to the processor 1002. The transceivers 1008 and antennae 1010 may be used with the above-mentioned circuitry to implement the various wireless transmission protocol stacks and interfaces. The mobile computing device 1000 may include a cellular network wireless modem chip 1016 that enables communication via a cellular network and is coupled to the processor.

The mobile computing device 1000 may include a peripheral device connection interface 1018 coupled to the processor 1002. The peripheral device connection interface 1018 may be singularly configured to accept one type of connection, or may be configured to accept various types of physical and communication connections, common or proprietary, such as USB, FireWire, Thunderbolt, or PCIe. The peripheral device connection interface 1018 may also be coupled to a similarly configured peripheral device connection port (not shown).

The mobile computing device 1000 may also include speakers 1014 for providing audio outputs. The mobile computing device 1000 may also include a housing 1020, constructed of a plastic, metal, or a combination of materials, for containing all or some of the components discussed herein. The mobile computing device 1000 may include a power source 1022 coupled to the processor 1002, such as a disposable or rechargeable battery. The rechargeable battery may also be coupled to the peripheral device connection port to receive a charging current from a source external to the mobile computing device 1000. The mobile computing device 1000 may also include a physical button 1024 for receiving user inputs. The mobile computing device 1000 may also include a power button 1026 for turning the mobile computing device 1000 on and off.

Figure 11:
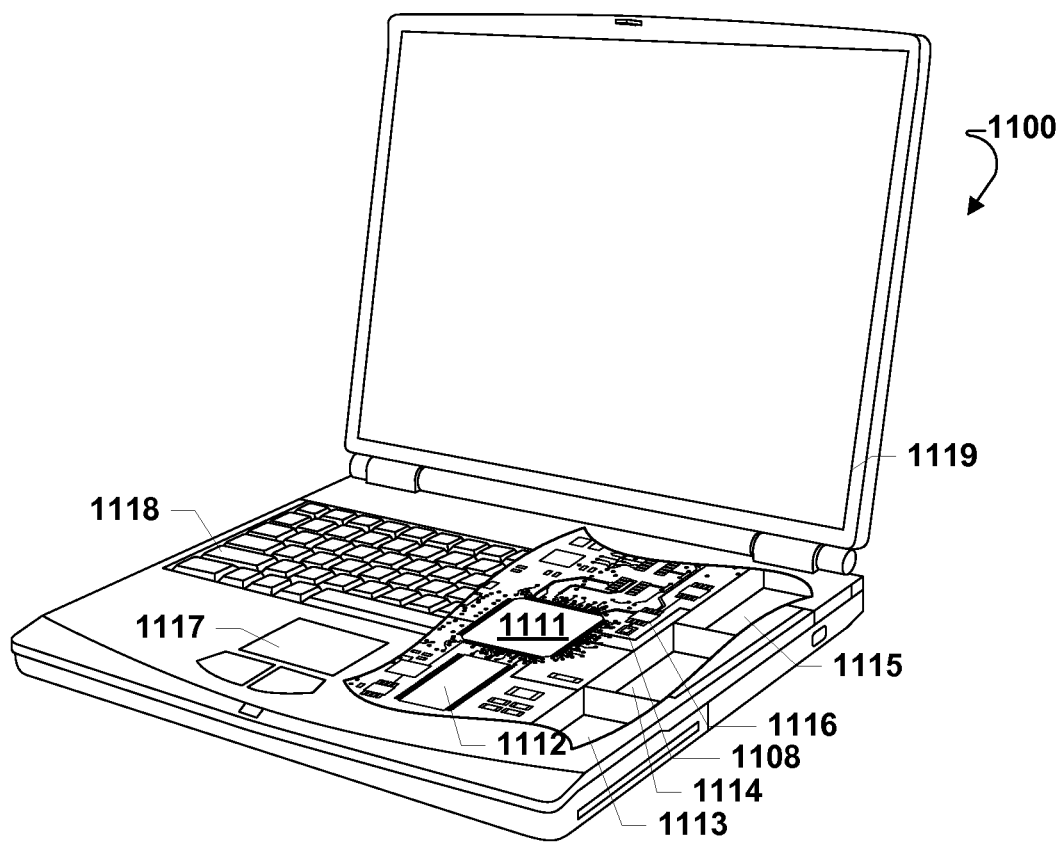
FIG. 11 is a component block diagram of a server device suitable for use in an aspect.

The various aspects described above may also be implemented within a variety of mobile computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antenna 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

The functions described in one or more aspects may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of generating and using data models in a mobile device, comprising:
   receiving, in a processor of the mobile device from a server computing device, a full classifier model, the received full classifier model including a plurality of decision nodes, each decision node in the plurality of decision nodes including a test condition and a weight value;
   collecting mobile device-specific information in the mobile device;
   identifying combinations of features that require monitoring and analysis in the mobile device, and determining a relative importance of each of the identified feature combinations, based on the collected mobile device-specific information;
   culling, via the processor of the mobile device, the received full classifier model to generate a lean classifier model that includes a subset of the plurality of decision nodes included in the received full classifier model, the culling comprising:
      identifying decision nodes included in the received full classifier model that include test conditions relevant to evaluating the identified feature combinations;
      prioritizing the identified decision nodes based on determined relative importance of the identified feature combinations; and
      generating the lean classifier model to include only the identified decision nodes, ordered in accordance with their priority;
   generating a behavior vector that characterizes a behavior of the mobile device; and
   applying, by the processor of the mobile device, the generated behavior vector to the generated lean classifier model to classify the behavior of the mobile device.

2. The method of claim 1, wherein:
   receiving the full classifier model comprises receiving a finite state machine that includes information that is suitable for conversion to the plurality of decision nodes; and
   culling the received full classifier model to generate the lean classifier model that includes the subset of the plurality of decision nodes included in the received full classifier model further comprises generating the lean classifier model to include only the identified decision nodes that evaluate a mobile device feature that is relevant to a current operating state or configuration of the mobile device.

3. The method of claim 2, wherein culling the received full classifier model to generate the lean classifier model that includes the subset of the plurality of decision nodes included in the received full classifier model further comprises:
   determining a number of unique test conditions that should be evaluated to classify the behavior without consuming an excessive amount of processing, memory, or energy resources of the mobile device;
   generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions; and
   generating the lean classifier model to include decision nodes in the full classifier model that test one of the test conditions included in the generated list of test conditions.

4. The method of claim 2, wherein applying the generated behavior vector to the generated lean classifier model in the mobile device to classify the behavior of the mobile device comprises using the lean classifier model to determine whether the behavior is not benign by:
   applying collected behavior information to each decision node in the lean classifier model;
   computing a weighted average of results of applying the collected behavior information to each decision node in the lean classifier model; and
   comparing the weighted average to a threshold value.

5. The method of claim 1, further comprising:
   monitoring the mobile device to detect a change in one of:
      a state of the mobile device,
      a configuration of the mobile device,
      a capability of the mobile device, and
      a functionality of the mobile device;
   modifying the lean classifier model to include an updated set of test conditions in response to detecting the change; and
   using the modified lean classifier model to classify the behavior of the mobile device.

6. The method of claim 5, wherein monitoring the mobile device and modifying the lean classifier model to include the updated set of test conditions in response to detecting the change comprises:

identifying an added mobile device feature associated with the detected change;
determining whether the identified added mobile device feature is included in the generated lean classifier model; and
adding the identified feature to the generated lean classifier model in response to determining that the identified feature is not included in the generated lean classifier model.

7. The method of claim 5, wherein monitoring the mobile device and modifying the lean classifier model to include the updated set of test conditions in response to detecting the change comprises:
detecting the change in the capability of the mobile device by detecting an addition of an auxiliary component to the mobile device;
determining whether the lean classifier model includes any test conditions that evaluate the auxiliary component;
determining whether the full classifier model includes any test conditions for the auxiliary component in response to determining that the lean classifier model does not include any test conditions that evaluate the auxiliary component; and
adding a new decision node that includes a new test condition associated with the auxiliary component to the lean classifier model in response to determining that the full classifier model includes test conditions for the auxiliary component.

8. The method of claim 5, wherein monitoring the mobile device and modifying the lean classifier model to include the updated set of test conditions in response to detecting the change comprises:
detecting the change in the functionality of the mobile device;
determining whether the detected change in functionality represents added or removed functionality;
determining whether the lean classifier model includes any test conditions that evaluate a mobile device feature affected by the detected change in functionality in response to determining that the detected change in functionality represents added functionality;
determining whether the full classifier model includes any test conditions that evaluate the mobile device feature in response to determining that the lean classifier model does not include any test conditions that evaluate the mobile device feature; and
adding a new decision node that includes a new test condition that evaluates the mobile device feature affected by the detected change to the lean classifier model in response to determining that the full classifier model includes test conditions that evaluate the mobile device feature.

9. The method of claim 5, wherein monitoring the mobile device and modifying the lean classifier model to include the updated set of test conditions in response to detecting the change comprises:
determining whether there has been the change in state on the mobile device;
identifying a feature that is relevant to a previous state of the mobile device and not relevant to a current state of the mobile device in response to determining that there has been the change in state on the mobile device; and
removing from the lean classifier model test conditions associated with the identified feature.

10. A mobile device, comprising:
a processor configured with processor-executable instructions to perform operations comprising:
receiving from a server computing device a full classifier model, the received full classifier model including a plurality of decision nodes, each decision node in the plurality of decision nodes including a test condition and a weight value;
collecting mobile device-specific information in the mobile device;
identifying combinations of features that require monitoring and analysis in the mobile device, and determining a relative importance of each of the identified feature combinations, based on the collected mobile device-specific information;
culling the received full classifier model to generate a lean classifier model that includes a subset of the plurality of decision nodes included in the received full classifier model, the culling comprising:
identifying decision nodes included in the received full classifier model that include test conditions relevant to evaluating the identified feature combinations;
prioritizing the identified decision nodes based on the determined relative importance of the identified feature combinations; and
generating the lean classifier model to include only the identified decision nodes, ordered in accordance with their priority;
generating a behavior vector that characterizes a behavior of the mobile device; and
applying the generated behavior vector to the generated lean classifier model in the mobile device to classify the behavior of the mobile device.

11. The mobile device of claim 10, wherein the processor is configured with processor-executable instructions to perform operations such that:
receiving the full classifier model comprises receiving a finite state machine that includes information that is suitable for conversion to the plurality of decision nodes; and
culling the received full classifier model to generate the lean classifier model that includes the subset of the plurality of decision nodes included in the received full classifier model further comprises generating the lean classifier model to include only the identified decision nodes that evaluate a mobile device feature that is relevant to a current operating state or configuration of the mobile device.

12. The mobile device of claim 11, wherein the processor is configured with processor-executable instructions to perform operations such that culling the received full classifier model to generate the lean classifier model that includes the subset of the plurality of decision nodes included in the received full classifier model further comprises:
determining a number of unique test conditions that should be evaluated to classify the behavior without consuming an excessive amount of processing, memory, or energy resources of the mobile device;
generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions; and generating the lean classifier model to include the identified decision nodes in the full classifier model that test one of the test conditions included in the generated list of test conditions.

13. The mobile device of claim 11, wherein the processor is configured with processor-executable instructions to perform operations such that applying the generated behavior vector to the generated lean classifier model in the mobile device to classify the behavior of the mobile device comprises using the lean classifier model to determine whether the behavior is not benign by:
applying collected behavior information to each decision node in the lean classifier model;
computing a weighted average of results of applying the collected behavior information to each decision node in the lean classifier model; and
comparing the weighted average to a threshold value.

14. The mobile device of claim 10, wherein the processor is configured with processor-executable instructions to perform operations further comprising:
monitoring the mobile device to detect a change in one of:
a state of the mobile device,
a configuration of the mobile device,
a capability of the mobile device, and
a functionality of the mobile device;
modifying the lean classifier model to include an updated set of test conditions in response to detecting the change; and
using the modified lean classifier model to classify the behavior of the mobile device.

15. The mobile device of claim 14, wherein the processor is configured with processor-executable instructions to perform operations such that monitoring the mobile device and modifying the lean classifier model to include the updated set of test conditions in response to detecting the change comprises:
identifying an added mobile device feature associated with the detected change;
determining whether the identified added mobile device feature is included in the generated lean classifier model; and
adding the identified feature to the generated lean classifier model in response to determining that the identified feature is not included in the generated lean classifier model.

16. The mobile device of claim 14, wherein the processor is configured with processor-executable instructions to perform operations such that monitoring the mobile device and modifying the lean classifier model to include the updated set of test conditions in response to detecting the change comprises:
detecting the change in the capability of the mobile device by detecting an addition of an auxiliary component to the mobile device;
determining whether the lean classifier model includes any test conditions that evaluate the auxiliary component;
determining whether the full classifier model includes any test conditions for the auxiliary component in response to determining that the lean classifier model does not include any test conditions that evaluate the auxiliary component; and
adding a new decision node that includes a new test condition associated with the auxiliary component to the lean classifier model in response to determining that the full classifier model includes test conditions for the auxiliary component.

17. The mobile device of claim 14, wherein the processor is configured with processor-executable instructions to perform operations such that monitoring the mobile device and modifying the lean classifier model to include the updated set of test conditions in response to detecting the change comprises:
detecting the change in the functionality of the mobile device;
determining whether the detected change in functionality represents added or removed functionality;
determining whether the lean classifier model includes any test conditions that evaluate a mobile device feature affected by the detected change in functionality in response to determining that the detected change in functionality represents added functionality;
determining whether the full classifier model includes any test conditions that evaluate the mobile device feature in response to determining that the lean classifier model does not include any test conditions that evaluate the mobile device feature; and
adding a new decision node that includes a new test condition that evaluates the mobile device feature affected by the detected change to the lean classifier model in response to determining that the full classifier model includes test conditions that evaluate the mobile device feature.

18. The mobile device of claim 14, wherein the processor is configured with processor-executable instructions to perform operations such that monitoring the mobile device and modifying the lean classifier model to include the updated set of test conditions in response to detecting the change comprises:
determining whether there has been the change in state on the mobile device;
identifying a feature that is relevant to a previous state of the mobile device and not relevant to a current state of the mobile device in response to determining that there has been the change in state on the mobile device; and
removing from the lean classifier model test conditions associated with the identified feature.

19. A non-transitory computer readable storage medium having stored thereon processor-executable software instructions configured to cause a processor of a mobile device to perform operations comprising:
receiving from a server computing device a full classifier model, the received full classifier model including a plurality of decision nodes, each decision node in the plurality of decision nodes including a test condition and a weight value;
collecting mobile device-specific information in the mobile device;
identifying combinations of features that require monitoring and analysis in the mobile device, and determining a relative importance of each of the identified feature combinations, based on the collected mobile device-specific information;
culling the received full classifier model to generate a lean classifier model that includes a subset of the plurality of decision nodes included in the received full classifier model, the culling comprises:
identifying decision nodes included in the received full classifier model that include test conditions relevant to evaluating the identified feature combinations;
prioritizing the identified decision nodes based on the determined relative importance of the identified feature combinations; and generating the lean classifier model to include only the identified decision nodes, ordered in accordance with their priority;

generating a behavior vector that characterizes a behavior of the mobile device; and applying the generated behavior vector to the generated lean classifier model in the mobile device to classify the behavior of the mobile device.

20. The non-transitory computer readable storage medium of claim 19, wherein the stored processor-executable software instructions are configured to cause a processor to perform operations such that:

receiving the full classifier model comprises receiving a finite state machine that includes information that is suitable for conversion to the plurality of decision nodes; and culling the received full classifier model to generate the lean classifier model that includes the subset of the plurality of decision nodes included in the received full classifier model further comprises generating the lean classifier model to include only the identified decision nodes that evaluate a mobile device feature that is relevant to a current operating state or configuration of the mobile device.

21. The non-transitory computer readable storage medium of claim 20, wherein the stored processor-executable software instructions are configured to cause a processor to perform operations such that culling the received full classifier model to generate the lean classifier model that includes the subset of the plurality of decision nodes included in the received full classifier model further comprises:

determining a number of unique test conditions that should be evaluated to classify the behavior without consuming an excessive amount of processing, memory, or energy resources of the mobile device;

generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions; and generating the lean classifier model to include the identified decision nodes in the full classifier model that test one of the test conditions included in the generated list of test conditions.

22. The non-transitory computer readable storage medium of claim 20, wherein the stored processor-executable software instructions are configured to cause a processor to perform operations such that applying the generated behavior vector to the generated lean classifier model in the mobile device to classify the behavior of the mobile device comprises using the lean classifier model to determine whether the behavior is not benign by:

applying collected behavior information to each decision node in the lean classifier model;

computing a weighted average of results of applying the collected behavior information to each decision node in the lean classifier model; and comparing the weighted average to a threshold value.

23. The non-transitory computer readable storage medium of claim 19, wherein the stored processor-executable software instructions are configured to cause a processor to perform operations further comprising:

monitoring the mobile device to detect a change in one of: a state of the mobile device, a configuration of the mobile device, a capability of the mobile device, and a functionality of the mobile device;

modifying the lean classifier model to include an updated set of test conditions in response to detecting the change; and using the modified lean classifier model to classify the behavior of the mobile device.

24. The non-transitory computer readable storage medium of claim 23, wherein the stored processor-executable software instructions are configured to cause a processor to perform operations such that monitoring the mobile device and modifying the lean classifier model to include the updated set of test conditions in response to detecting the change comprises:

identifying an added mobile device feature associated with the detected change;

determining whether the identified feature is included in the generated lean classifier model; and adding the identified feature to the generated lean classifier model in response to determining that the identified feature is not included in the generated lean classifier model.

25. The non-transitory computer readable storage medium of claim 23, wherein the stored processor-executable software instructions are configured to cause a processor to perform operations such that monitoring the mobile device and modifying the lean classifier model to include the updated set of test conditions in response to detecting the change comprises:

detecting the change in the capability of the mobile device by detecting an addition of an auxiliary component to the mobile device;

determining whether the lean classifier model includes any test conditions that evaluate the auxiliary component;

determining whether the full classifier model includes any test conditions for the auxiliary component in response to determining that the lean classifier model does not include any test conditions that evaluate the auxiliary component; and adding a new decision node that includes a new test condition associated with the auxiliary component to the lean classifier model in response to determining that the full classifier model includes test conditions for the auxiliary component.

26. The non-transitory computer readable storage medium of claim 23, wherein the stored processor-executable software instructions are configured to cause a processor to perform operations such that monitoring the mobile device and modifying the lean classifier model to include the updated set of test conditions in response to detecting the change comprises:

detecting the change in the functionality of the mobile device;

determining whether the detected change in functionality represents added or removed functionality;

determining whether the lean classifier model includes any test conditions that evaluate a mobile device feature affected by the detected change in functionality in response to determining that the detected change in functionality represents added functionality;

determining whether the full classifier model includes any test conditions that evaluate the mobile device feature in response to determining that the lean classifier model does not include any test conditions that evaluate the mobile device feature; and adding a new decision node that includes a new test condition that evaluates the mobile device feature affected by the detected change to the lean classifier model in response to determining that the full classifier model includes test conditions that evaluate the mobile device feature.

27. The non-transitory computer readable storage medium of claim 23, wherein the stored processor-executable software instructions are configured to cause a processor to perform operations such that monitoring the mobile device and modifying the lean classifier model to include the updated set of test conditions in response to detecting the change comprises:

determining whether there has been the change in state on the mobile device;

identifying a feature that is relevant to a previous state of the mobile device and not relevant to a current state of the mobile device in response to determining that there has been the change in state on the mobile device; and removing from the lean classifier model test conditions associated with the identified feature.

28. A mobile device, comprising:

means for receiving from a server computing device a full classifier model, the received full classifier model including a plurality of decision nodes, each decision node in the plurality of decision nodes including a test condition and a weight value;

means for collecting mobile device-specific information in the mobile device;

means for identifying combinations of features that require monitoring and analysis in the mobile device, and determining a relative importance of each of the identified feature combinations, based on the collected mobile device-specific information;

means for culling, via the processor of the mobile device, the received full classifier model to generate a lean classifier model that includes a subset of the plurality of decision nodes included in the received full classifier model, the means for culling comprising:

means for identifying decision nodes included in the received full classifier model that include test conditions relevant to evaluating the identified feature combinations;

means for prioritizing the identified decision nodes based on the determined relative importance of the identified feature combinations; and means for generating the lean classifier model to include only the identified decision nodes, ordered in accordance with their priority;

means for generating a behavior vector that characterizes a behavior of the mobile device; and means for applying the generated behavior vector to the generated lean classifier model to classify the behavior of the mobile device.

29. The mobile device of claim 28, wherein:

means for receiving the full classifier model comprises means for receiving a finite state machine that includes information that is suitable for conversion to the plurality of decision nodes; and means for culling the received full classifier model to generate the lean classifier model that includes the subset of the plurality of decision nodes included in the received full classifier model further comprises means for generating the lean classifier model to include only the identified decision nodes that evaluate a mobile device feature that is relevant to a current operating state or configuration of the mobile device.

30. The mobile device of claim 29, wherein means for culling the received full classifier model to generate the lean classifier model further comprises:

means for determining a number of unique test conditions that should be evaluated to classify the behavior without consuming an excessive amount of processing, memory, or energy resources of the mobile device;

means for generating a list of test conditions by sequentially traversing the plurality of test conditions in the full classifier model and inserting those test conditions that are relevant to classifying the behavior of the mobile device into the list of test conditions until the list of test conditions includes the determined number of unique test conditions; and means for generating the lean classifier model to include the identified decision nodes in the full classifier model that test one of the test conditions included in the generated list of test conditions.

* * * * *